United States Patent
Chen et al.

(10) Patent No.: US 11,687,645 B2
(45) Date of Patent: Jun. 27, 2023

(54) SECURITY CONTROL METHOD AND COMPUTER SYSTEM

(71) Applicant: HUAWEI TECHNOLOGIES CO., LTD., Guangdong (CN)

(72) Inventors: Haibo Chen, Shanghai (CN); Nan Wang, Beijing (CN); Shanxi Chen, Shenzhen (CN); Miao Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 16/838,935

(22) Filed: Apr. 2, 2020

(65) Prior Publication Data
US 2020/0250302 A1  Aug. 6, 2020

Related U.S. Application Data

(63) Continuation of application No. PCT/CN2018/109416, filed on Oct. 9, 2018.

(30) Foreign Application Priority Data

Oct. 13, 2017 (CN) .......................... 201710952362.4

(51) Int. Cl.
*G06F 21/54* (2013.01)
*G06N 20/00* (2019.01)
(Continued)

(52) U.S. Cl.
CPC .............. *G06F 21/54* (2013.01); *G06F 21/74* (2013.01); *G06N 20/00* (2019.01); *G06F 7/582* (2013.01);
(Continued)

(58) Field of Classification Search
CPC .......... G06F 21/54; G06F 21/64; G06F 21/74; G06F 16/245; G06F 2221/033; G06F 2221/2101; F06N 20/00; G06N 20/00
See application file for complete search history.

(56) References Cited

U.S. PATENT DOCUMENTS 5,794,252 A    8/1998 Bailey et al.
9,253,209 B2 * 2/2016 Muppidi ............. H04W 12/086
(Continued)

FOREIGN PATENT DOCUMENTS

CN    104134038 A  * 11/2014 ............. G06F 21/53
CN    104318182 A      1/2015
(Continued)

OTHER PUBLICATIONS

Manoranjan Mohanty et al: "Media Data Protection during Execution on Mobile Platforms—A Review", Jul. 4, 2014 (Jul. 4, 2014), XP05519466, total 31 pages. Retrieved from the Internet: URL:http://soda.swedish-ict.se/5685/1/Media_Data_Protection_during_Execution_on_Mobile_Platforms_%E2%80%93_A_Review.pdf.
(Continued)

*Primary Examiner* — Matthew T Henning
(74) *Attorney, Agent, or Firm* — Gregg L. Jansen

(57) ABSTRACT

A security control method and a computer system are provided. A first domain and a second domain are deployed in the computer system, the second domain is more secure than the first domain, a program is deployed in the first domain, and a control flow management module and an audit module are deployed in the second domain. The second domain is more secure than the first domain. When the program in the first domain is executed, the control flow management module obtains control flow information by using a tracer. The audit module audits the to-be-audited information according to an audit rule, and when the to-be-audited information matches the audit rule, determines that
(Continued)

the audit succeeds and then allows the first domain to perform a subsequent operation, for example, to access a secure program in the second domain.

20 Claims, 21 Drawing Sheets

(51) Int. Cl.
*G06F 21/74* (2013.01)
*G06F 16/245* (2019.01)
*G06F 7/58* (2006.01)
*G06F 21/57* (2013.01)
*G06Q 50/26* (2012.01)

(52) U.S. Cl.
CPC ............ *G06F 7/588* (2013.01); *G06F 16/245* (2019.01); *G06F 21/577* (2013.01); *G06F 2221/033* (2013.01); *G06F 2221/2101* (2013.01); *G06Q 50/265* (2013.01)

(56) References Cited

U.S. PATENT DOCUMENTS

| | | |
|---|---|---|
| 9,390,261 B2 | 7/2016 | Costa et al. |
| 9,846,717 B2 | 12/2017 | Pike et al. |
| 2008/0288789 A1 | 11/2008 | Harris et al. |
| 2014/0075496 A1 | 3/2014 | Prakash et al. |
| 2015/0135313 A1 | 5/2015 | Wesie et al. |
| 2015/0373004 A1* | 12/2015 | Hopkins ................. H04L 67/10 726/6 |
| 2016/0283712 A1 | 9/2016 | Kanhere et al. |
| 2016/0323278 A1 | 11/2016 | Yang et al. |
| 2018/0330101 A1* | 11/2018 | Dietsch ................. G06F 21/577 |
| 2019/0073473 A1* | 3/2019 | VanderLeest ....... G06F 21/6218 |
| 2019/0392166 A1* | 12/2019 | Awad ................. G06F 21/6281 |

FOREIGN PATENT DOCUMENTS

| | | |
|---|---|---|
| CN | 104541279 A | 4/2015 |
| CN | 104794395 A | 7/2015 |
| CN | 104794410 A | 7/2015 |
| CN | 105760444 A | 7/2016 |
| CN | 106295350 A | 1/2017 |
| CN | 106921799 A | 7/2017 |
| CN | 107194252 A | 9/2017 |
| JP | 2013218698 A | 10/2013 |
| KR | 20170024014 A | 3/2017 |

OTHER PUBLICATIONS

Five dogs:"Hackers crack TrustZone, indicating that mobile phone independent security chip is necessary", Nov. 7, 2016. total 10 pages. Retrieved from the internet: https://www.sohu.com/a/118347895_115117. on Jun. 1, 2020.

* cited by examiner

SECURITY CONTROL METHOD AND COMPUTER SYSTEM

CROSS-REFERENCE TO RELATED APPLICATIONS

This application is a continuation of International Application No. PCT/CN2018/109416, filed on Oct. 9, 2018, which claims priority to Chinese Patent 201710952362.4, filed on Oct. 13, 2017. The disclosures of the aforementioned applications are hereby incorporated by reference in their entireties.

TECHNICAL FIELD

This application relates to a security control technology of a computer system, and in particular, to a method, a device, and a system for implementing system security by auditing information such as a control flow.

BACKGROUND

A terminal device poses increasing requirements on processing important services. From paying for, downloading, and watching a latest Hollywood film of a specific period to remotely paying bills and managing a bank account by using a mobile phone, these development trends make the terminal device become a major attack target of malware, and viruses such as a Trojan horse and Rootkit. To ensure security of the terminal device, a terminal device security framework represented by TrustZone emerges.

In an existing TrustZone framework, system-level security is separately obtained by dividing software and hardware resources of a system on chip (system on chips, SoC) into two worlds: a normal world (normal world) and a secure world (secure world) (which may also be referred to as a secure domain and an insecure domain). The two worlds are respectively corresponding to a rich execution environment (rich execution environment, REE) and a trusted execution environment (trusted execution environment, TEE). The TEE and the REE run on a same device. The TEE can ensure that sensitive data is stored, processed, and protected in the trusted environment, and provides a secure execution environment for an authorized trusted application (trusted application, TA). A client application (client application, CA) (also referred to as a normal application) runs in the REE. The CA accesses the TA by calling an application programming interface (application programming interface, API) of a TEE client in the REE, to use a security function provided by the TEE and the TA.

In the prior art, to ensure security of accessing the TA by the CA, a CA authentication program is set on the REE side. The authentication program is used to extract identity information of the CA, to subsequently verify an identity of the CA. Specifically, before the CA accesses the TA, the REE side extracts the identity information of the CA by executing the authentication program, and then submits the identity information to the TEE side by using a secure monitor call (secure monitor call, SMC). Only after the verification succeeds on the TEE side, the CA is allowed to access a TA that the CA expects to access. However, on the REE side, an operating system (operating system, OS) in which the CA runs may be cracked. Consequently, the authentication program is bypassed, in other words, the authentication program is not executed. For example, various CAs are deployed in a REE-side OS represented by Linux®, and a CA authentication program is deployed in Linux®. Linux® has superuser permission, namely, root permission. After Linux® undergoes super permission escalation (that is, is rooted), original permission management is no longer effective. In other words, in rooted Linux®, the CA possibly bypasses the authentication program in some attack cases. If the authentication program is bypassed, a procedure of extracting identity information of the CA is omitted. As a result, a forged CA can directly submit forged identity information to the TEE side, and after verification succeeds on the TEE side, the forged CA can call the security function provided by the TA, such as a fingerprint verification function. Consequently, a series of system security problems are caused.

SUMMARY

This application provides a computer system, a terminal device, a security control method applied to the computer system and the terminal device, and the like, to improve security of the terminal device or another type of computer system.

To facilitate understanding of technical solutions provided in this application, some elements used in descriptions of this application are first described herein.

Domain: A domain is a logical organization unit in a computer system, and may be specifically a logical organization unit inside a computer device. Each domain has a security policy of the domain, and there is a security boundary between different domains. In the computer system, the domain may be obtained through software division, for example, a user mode and a kernel mode in a Linux® system, or for another example, a host (host) layer and a guest (guest) layer that are obtained by using a virtualization technology. Alternatively, the domain may be obtained through hardware division, for example, a secure domain and an insecure domain that are based on TrustZone.

Tracer: A tracer, also referred to as a tracer in this application, and is configured to record a transfer instruction (such as a jump instruction), a data transmission instruction (such as a load instruction and a store instruction in ARM®), and the like that are sent by a CPU. These instructions may be used as control flow information to reconstruct a control flow, obtain dynamic data, and the like. For example, the tracer may be a CoreSight in an ARM® architecture, an IPT (Intel® Processor Tracer) in an X86 architecture, or another unit or module that can trace a CPU instruction. The tracer may independently exist as an apparatus, or may be partially or all embedded into a CPU or other hardware.

Control flow (also referred to as an execution flow): A control flow represents an execution procedure of a program. The control flow may be directly or indirectly represented as an instruction address sequence or an event sequence. For example, code x=y is translated into the following assembly language: 0x1234: load [y]; 0x1238: store r0, [x]. Herein, a value of y stored in memory flows to a register of a CPU, and then flows to memory of x. A control flow of the code is that 0x1234 is first executed and then 0x1238 is executed. The value of y is dynamic data in an execution procedure of the code.

Control flow information: Control flow information is used to represent information that can be used to reconstruct a control flow. In some descriptions, the control flow information is one of a plurality of pieces of control flow information of a control flow that constitutes a segment of program. In other descriptions, the control flow information is all information of a control flow that constitutes a segment of program. In some other descriptions, the control flow information may be a control flow. For details, refer to a context of the descriptions.

Data flow: A data flow represents a data read/write procedure of a program, and includes data in the procedure. The data flow may be directly or indirectly represented as a data read/write event sequence of the program. In some embodiments of this application, data included in the read/write event sequence is audited to ensure system security. The data is usually dynamic data.

Data flow information: Data flow information is used to represent information that can be used to reconstruct a data flow, and includes dynamic data. In some descriptions, the data flow information is one of a plurality of pieces of dynamic data of a data flow that constitutes a segment of program. In other descriptions, the data flow information is all dynamic data of a data flow that constitutes a segment of program. In some other descriptions, the data flow information may be a data flow. For details, refer to a context of the descriptions.

Automaton: An automaton is a mathematic model implemented by a computer. The automaton may respond to an external input (for example, an event), to switch from a state to another state. An automaton instance is a runtime automaton. In embodiments provided in this application, a rule or a model is used to audit information such as a control flow, and the automaton is an implementation of the "rule or model".

"Executing an action in a first domain or a second domain" may be understood as that an execution body of the action is deployed in the first domain or the second domain, or may be understood as that an execution body of the action is in a state represented by the first domain or the second domain, and the execution body of the action may be a hardware module or a software module. Alternatively, because a "domain" is a logical organization unit, in some cases, "executing an action in a first domain or a second domain" may be understood as that an execution body of the action is the first domain or the second domain.

"A plurality of" or "a plurality of times" in this application means "at least two" or "at least two times", unless otherwise specified. "First" and "second" in this application are not intended to limit an order, and are only used to distinguish between two bodies in a context of some descriptions for ease of understanding. However, bodies indicated by "first" and "second" are not necessarily different bodies in all embodiments. "A/B" or "A and/or B" in this application includes three cases: A, B, and both A and B. In this application, "A®" means that A is a brand name, and a term without® may also be a brand name.

The following describes the technical solutions provided in this application in different aspects. It should be understood that the following aspects do not necessarily include all implementations provided in this application. In addition, for implementations and benefits of different aspects, mutual reference may be made between the aspects.

According to a first aspect, this application provides a computer system. The computer system may be specifically a terminal device. A first domain and a second domain are deployed in the terminal device, a program is deployed in the first domain, and a control flow management module and an audit module are deployed in the second domain. A tracer is further deployed in the terminal device, to implement integrity audit on a control flow of the program together with the control flow module and the audit module. Specifically, the control flow management module is configured to: when the program in the first domain is executed, obtain to-be-audited information by using the hardware tracer, where the to-be-audited information includes control flow information of the program. The audit module is configured to: audit the to-be-audited information according to an audit rule, and when the to-be-audited information matches the audit rule, determine that the audit succeeds. A domain responsible for auditing is usually more secure than (or as secure as) a domain in which an audited program runs. The first domain and the second domain may be obtained through software and/or hardware division.

In some implementations, the first domain and the second domain are respectively an insecure world and a secure world (which may also be construed as a REE and a TEE) that are based on TrustZone.

It can be learned that, control flow information of a key program (referred to as a to-be-protected program in the following specific implementations) is obtained by using the tracer such as a CoreSight or an IPT, and integrity audit is performed, in another domain, on a control flow of the program according to a preset audit rule. A next operation is allowed only when the control flow matches the audit rule. For example, the program or another program related to the program is allowed to access a function and the like of a domain in which the audit module is located. This avoids a system vulnerability caused because execution of the key program is bypassed or unauthorized due to an attack means, thereby improving security of the terminal device.

It should be noted that control flow integrity audit may also be referred to as control flow integrity verification, and is briefly referred to as control flow audit in this application.

In some implementations, the program may be stored in a read-only storage area of a memory deployed in the first domain, to prevent the program from being modified and further ensure security.

In some implementations, the to-be-audited information further includes data flow information of the program. When control flow audit is performed, the data flow information of the program is also audited. Therefore, security of data in code is also ensured while security of an execution procedure of the code is ensured, thereby further improving security of the terminal device.

In some implementations, the terminal device further includes a tracer review module deployed in the second domain. The tracer review module is configured to review the tracer before the audit module performs the audit. Specifically, the tracer review module reviews whether a register of the tracer has been modified; and if the register has been modified, the review fails; or otherwise, the review succeeds. After the review succeeds, the tracer review module triggers the audit module to perform the audit. The tracer is first reviewed before the tracer performs security audit, to ensure that the tracer is not tampered with and ensure reliability of an audit procedure.

In some implementations, the terminal device further includes a process identification obtaining module deployed in the first domain. The process identification obtaining module is configured to: before the tracer collects the control flow information, obtain a process identification (for example, a PID or a process name) of a process that executes the program, and store the process identification in a first register of the tracer. The control flow management module is specifically configured to: obtain the to-be-audited information by using the tracer. The to-be-audited information further includes the process identification, and the process identification is a process identification that is read by the tracer from the first register. The audit module is specifically configured to: search, based on the process identification, for an audit rule that matches the process identification, and audit the control flow information according to the found audit rule.

Before collecting each piece of control flow information is triggered, a process identification of a current process is first obtained; then collecting control flow information of a program executed by the current process is triggered; and then the control flow information and the process identification are associated and stored. It is equivalent to that each piece of control flow information has a process identification to identify a source of the control flow information. In this way, the audit module can distinguish between control flow information of different programs based on the process identification, and select an audit rule that matches the control flow information to perform audit, to audit a plurality of programs in parallel.

In some implementations, the terminal device further includes a first random number generator and an auto-collection module that are deployed in the first domain, and the second domain includes a text segment of the program. The text segment herein may be placed in the second domain through hardcoding. The auto-collection module is configured to: before the program is executed, call the first random number generator to generate a random number RX; store the random number RX in a second register of the tracer; and obtain a hash value H1 through calculation based on the random number RX and the text segment of the process that executes the program. The control flow management module is specifically configured to: obtain the to-be-audited information by using the tracer. The to-be-audited information herein further includes the random number RX, and RX is obtained by the tracer by accessing the second register. The audit module is specifically configured to: obtain the hash value H1; obtain a hash value H2 through calculation based on the random number RX and the text segment included in the second domain; compare H1 with H2; and when H1 is the same as H2 and other to-be-audited information matches the audit rule, determine that the audit succeeds.

In some other implementations, the text segment may be scrambled in another form in addition to the random number.

In some other implementations, the random number RX may not be generated and the hash value H1 is not calculated. Only a text segment is transmitted, and is then compared with the text segment included in the second domain.

A "text segment" is a segment of storage area. A text segment of a program includes code and a constant of the program. A "text segment" in the claims is all or partial content included in the text segment, content of a compressed text segment, or a digest of content included in the text segment.

It should be understood that the term "text" is usually used in Linux® or Unix®. In another system, a storage area including program code and a constant may have another name. It should be understood that in this application, the "text" segment is a storage area that has an equivalent meaning in all types of systems.

The text segment includes code and a constant of the program. Content of the text segment is first placed in the second domain, and then a text segment is obtained again in a running procedure of the program and is transmitted to the second domain. The two obtained text segments are compared, and only when the two obtained text segments are the same, it is determined that the audit succeeds. This can further ensure security of the program. Further, in a procedure of transmitting the text segment, scrambling is performed by using a random number. This can further improve security of transmitting the text segment, thereby ensuring audit reliability.

In some implementations, the terminal device further includes a first random number generator deployed in the first domain and a second random number generator deployed in the second domain. The first random number generator herein may be the random number generator in the foregoing implementation or another random number generator. The to-be-audited information obtained by the control flow management module further includes a random number. When the program is executed, the first random number generator is called to generate the random number. The random number is written into a third register of the tracer. Then, when collecting the control flow information, the tracer accesses the third register to obtain the random number currently stored in the register, and uses the random number together with the current control flow information as one piece of to-be-audited information. The audit module is specifically configured to: obtain the last random number RY generated by the first random number generator in an execution procedure of the program; obtain a quantity n of random number generation times preconfigured in the second domain; trigger, based on n, the second random number generator to generate n random numbers; compare an $n^{th}$ random number Rn with RY; and when Rn is the same as RY and other to-be-audited information matches the audit rule, determine that the audit succeeds.

In other words, the first random number generator (in the first domain) generates a plurality of random numbers when the program is executed. Each random number is written into the register of the tracer after the random number is generated. Then the tracer reads the random numbers from the register when collecting the control flow information, and transfers the random numbers together with the control flow information to the second domain. The audit module in the second domain may determine, from the transferred random numbers in a plurality of manners, the random number RX that is generated by the first random number generator for the last time, and then obtain the quantity n of random number generation times corresponding to the random number RX, where n is preconfigured in the second domain based on a case in which the program is normally executed. Then the audit module calls the second random number generator to generate the n random numbers and selects the $n^{th}$ random number thereof. If the random numbers obtained in the two manners are the same, it indicates that execution of the program in the first domain has not been interfered with.

The "audit rule" used in this application may be construed differently in different implementations. For example, when the to-be-audited information includes only control flow information, it may be understood that the audit rule includes only a rule for auditing a control flow. When the to-be-audited information includes other information such as data flow information, a process identification, a random number, and a text segment, it may be understood that the audit rule further includes a rule for matching a process identification and/or a rule for reviewing information such as a random number and a text. In some other implementations, it may be alternatively understood that the "audit rule" includes only a rule for auditing a control flow, and matching or reviewing other information belongs to another model or rule. The "audit rule" has a plurality of implementations. The audit rule may be an automaton or an audit model, or may be a table, a list, a determining statement, or the like. A complex audit rule may be implemented through machine learning. For example, the program may run on the terminal device or a server end through simulation, an execution feature (or referred to as a model) of the program is obtained through learning, and then the execution feature and information such as an actual execution procedure of the program are matched to determine whether the actual execution procedure is authorized.

In some implementations, all or some components of the tracer are placed in the second domain through hardware division or software permission management. The second domain is more secure than the first domain. In this manner, security of the tracer can be ensured. Reviewing the tracer in the foregoing implementation is not necessary. Certainly, the review can still be performed, to ensure security of the tracer by using a dual mechanism.

In some implementations, trigger instructions are inserted at a plurality of locations in the program, to trigger the tracer to collect control flow information at a specific location. In some other implementations, the tracer may not need to be triggered by using a trigger instruction, but collect all control flow information of the program.

According to a second aspect, this application further provides an audit method. The method is applied to a computer system in which a first domain and a second domain are deployed. When a program in the first domain is executed, to-be-audited information is obtained from the second domain by using a tracer. The to-be-audited information includes control flow information of the program. The to-be-audited information is audited in the second domain according to an audit rule. When the to-be-audited information matches the audit rule, it is determined that the audit succeeds. The tracer may be all or partially deployed in the second domain.

After the audit method is applied to security control, a next operation is allowed after the audit succeeds. For example, the program or a next program related to the program is allowed to access a security program in the second domain.

In some implementations, the tracer is not started until execution of the program starts, and then the to-be-audited information collected by the tracer is obtained from the second domain synchronously or asynchronously. In some other implementations, the tracer is not started until intermediate key code of the program is executed, or the tracer may be kept in a started state after a system is started.

In some implementations, the to-be-audited information further includes data flow information of the program.

In some implementations, before the control flow information is audited, the tracer is reviewed in the second domain, and the control flow information is audited after the review succeeds.

In some implementations, before the to-be-audited information is obtained by using the tracer, a process identification of a process that executes the program is obtained, and the process identification is stored in a first register of the tracer. Then the to-be-audited information collected by the tracer is obtained. In this case, the to-be-audited information includes the control flow information and the process identification existing in the first register when the control flow information is collected. In other words, the process identification is a current process identification that is read by the tracer from the first register when the tracer collects the control flow information. Then an audit rule that matches the process identification is searched for based on the process identification, and the control flow information is audited according to the found audit rule.

In some implementations, the computer system further includes a first random number generator deployed in the first domain, and the second domain includes a text segment of the program. Before the program is executed, the first random number generator is called in the first domain to generate a random number RX; the random number RX is stored in a second register of the tracer; and a hash value H1 is obtained through calculation based on the random number RX and the text segment of the process that executes the program. The to-be-audited information collected by the tracer is obtained. In this case, the to-be-audited information includes the control flow information and the random number RX, and RX is obtained by the tracer by accessing the second register. The hash value H1 is obtained from the second domain. A hash value H2 is obtained through calculation based on the random number RX and the text segment included in the second domain. H1 is compared with H2. When H1 is the same as H2 and other to-be-audited information matches the audit rule, it is determined that the audit succeeds. In some implementations, the computer system further includes a first random number generator deployed in the first domain and a second random number generator deployed in the second domain. When the program is executed, the first random number generator is called in the first domain to generate a random number, and the random number is written into a third register of the tracer. The to-be-audited information is obtained by using the tracer. The to-be-audited information includes the control flow information and the random number existing in the third register when the control flow information is collected. The last random number RY generated by the first random number generator in an execution procedure of the program is obtained from the second domain, and a quantity n of random number generation times preconfigured in the second domain is obtained. Then the second random number generator is triggered, based on n, to generate n random numbers, and an $n^{th}$ random number Rn is compared with RY. When Rn is the same as RY and other to-be-audited information matches the audit rule, it is determined that the audit succeeds.

It should be understood that in the foregoing implementation in which a random number is required, not all to-be-audited information needs to include a random number.

According to a third aspect, this application further provides a computer readable storage medium. The storage medium includes a computer readable instruction. When the computer readable instruction is executed by one or more processors, the computer readable instruction is used to implement any one of the foregoing methods.

According to a fourth aspect, this application further provides a computer program product. The computer program product includes a computer readable instruction. When the computer readable instruction is executed by one or more processors, the computer readable instruction is used to implement any one of the foregoing methods.

According to a fifth aspect, this application further provides a computer system. A hardware layer of the computer system includes a tracer, a processor, and a memory. The computer system can be logically divided into a first domain and a second domain. The processor is configured to: read a computer readable instruction from the memory, and execute the computer readable instruction, to start the tracer and execute a program in the first domain. The hardware tracer is configured to: when the program is executed, collect to-be-audited information related to the program. Further, the second domain may be more secure than (or as secure as) the first domain.

In some implementations, an action of collecting the to-be-audited information by the tracer is triggered by the processor when the processor executes the program. For example, a trigger instruction is inserted into the program. In some other implementations, the action is triggered by the processor in another case, or may be autonomously executed after the tracer is started.

BRIEF DESCRIPTION OF DRAWINGS

To describe technical solutions provided in this application more clearly, the following briefly describes the accompanying drawing. Apparently, the accompanying drawings in the following descriptions show only some embodiments of this application.

DESCRIPTION OF EMBODIMENTS

Embodiment 1

Figure 1:
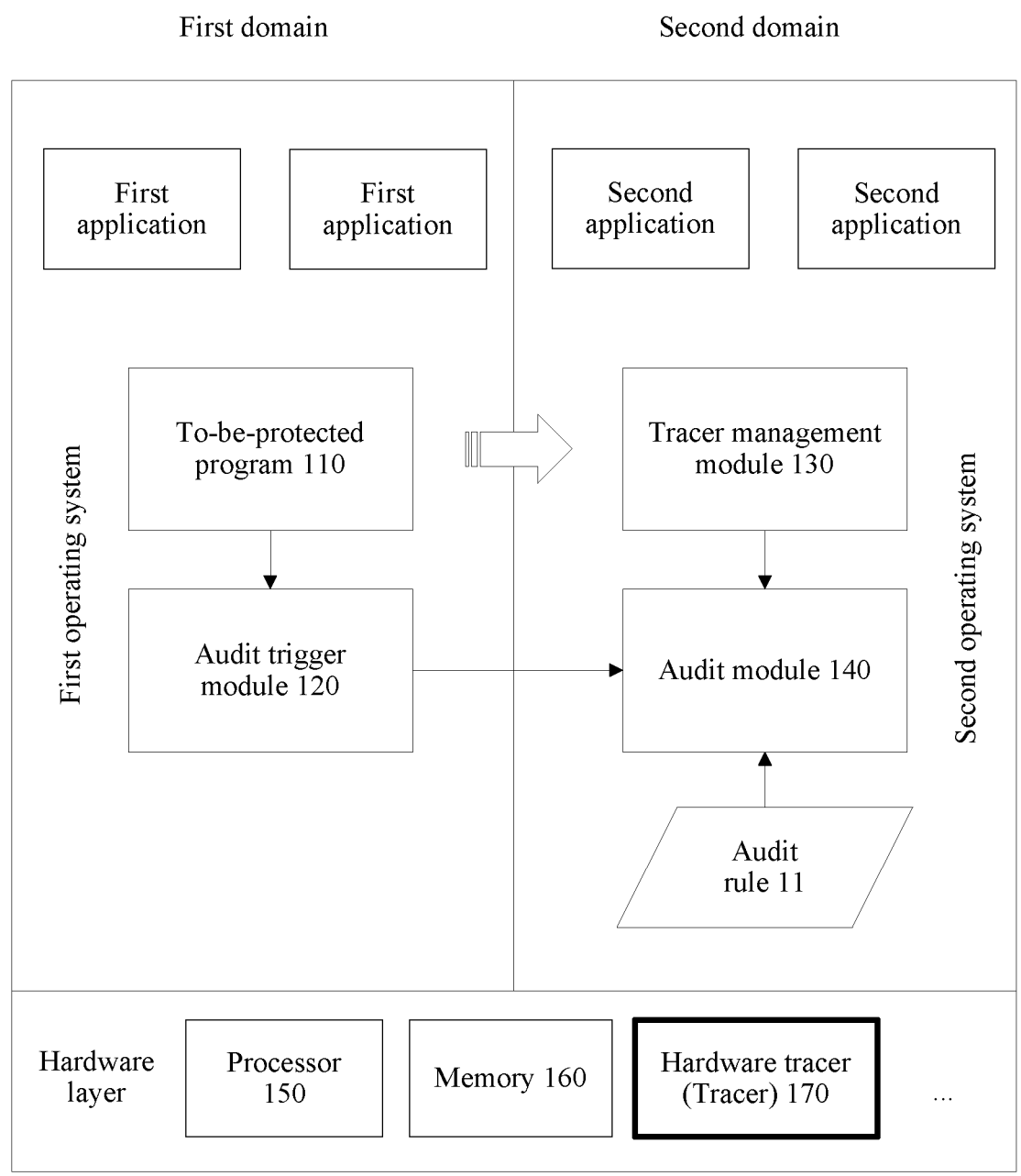
FIG. 1 is a schematic structural diagram of a computer system according to an embodiment.

FIG. 1 is a schematic structural diagram of a computer system according to an embodiment. The computer system includes a hardware layer. The hardware layer includes a processor 150, a memory 160, and a tracer 170. The computer system may be specifically a terminal device, a fixed terminal, or a mobile terminal. The fixed terminal is, for example, a personal computer, a point of sale (point of sale, POS), or an automatic teller machine. The mobile terminal is, for example, a computer with a mobility feature, such as a smartphone, a laptop computer, a digital broadcasting terminal, a personal digital assistant, a portable multimedia player, or an in-vehicle navigation system. It should be understood that in addition to the terminal device, a method provided in any embodiment of this application may also be applied to another type of computer system such as a server.

The processor 150 may be a single-core processor or a multi-core processor. The computer system may also include a plurality of types of processors. The memory 160 may include one or more of the following types: a flash (flash) memory, a memory of a hard disk type, a memory of a micro multimedia card type, a card-type memory (for example, an SD or XD memory), a random access memory (random access memory, RAM), a static random access memory (static RAM, SRAM), a read-only memory (read-only memory, ROM), an electrically erasable programmable read-only memory (electrically erasable programmable read-only memory, EEPROM), a programmable read-only memory (programmable ROM, PROM), a magnetic memory, a magnetic disk, or an optical disc.

In some other embodiments, the memory 160 may include a network storage device in the Internet. The computer system may perform an operation such as updating or reading on the memory 160 in the Internet.

From a perspective of software, the computer system is divided into two domains: a first domain and a second domain. The two domains are run by a same processor, but are run in different states of the processor. A first operating system and a second operating system respectively run in the two domains. A plurality of first applications and a plurality of second applications respectively run in the first operating system and the second operating system.

It should be noted that the first operating system and the second operating system may be of a same type or different types. Alternatively, the first operating system and the second operating system may be two different states of a same operating system, for example, a user mode and a kernel mode. In other words, the first domain and the second domain are two states of a same operating system.

A to-be-protected program 110 is set in the first operating system. In a running procedure of the to-be-protected program, a tracer 170 collects running-related control flow information of the program and the like, and then a tracer management module 130 may obtain the information. The to-be-protected program 110 may be a part of the first application.

The "to-be-protected program" is any segment of program that needs to be protected. The program needs to be executed according to an original execution procedure, and cannot be tampered with or bypassed. The to-be-protected program may be at any location in the system, and may reside on a REE side or a TEE side in the following embodiment. For example, the to-be-protected program may be a kernel module (a module with an extension KO) in Linux®, or a CA authentication module.

Feature information and other information may be obtained in the following manner: separately inserting, at one or more locations in function code, one or more trigger instructions used to trigger information collection, to generate the to-be-protected program 110. When the to-be-protected program 110 proceeds to the trigger instructions, the tracer 170 is triggered to collect related information of the to-be-protected program 110. The information (referred to as to-be-audited information below) may include one or more types of the following information: control flow information that is related to code running and that is used for control flow audit, dynamic data that is used for data audit and that exists in a code execution procedure, a random number used to ensure information transmission security, a process ID (process identification, PID) that is used to identify the to-be-protected program in parallel audit, and the like.

In the code execution procedure, operated non-read-only data is dynamic data, and operated read-only data is static data. For example, in the example of explaining the control flow in SUMMARY, the value of y is dynamic data. For another example, code and data included in a text segment are usually static data. The dynamic data can be obtained by the tracer by tracing a load instruction and a store instruction. For example, code x=y is corresponding to a load instruction and a store instruction. The load instruction is used to read a value of y from memory of y to a register, and the store instruction is used to write the value in the register into memory of x. Memory data is usually read/written by using the load instruction and the store instruction, and therefore the dynamic data can be obtained by tracing the two instructions.

The to-be-protected program 110 may be generated in another computer system in addition to the computer system. Content of the trigger instruction, a specific insertion location, and the like may be determined by a developer, or may be automatically generated by a computer after a specific rule is input into the computer. The trigger instruction may be manually inserted by the developer into the to-be-protected program during development, or may be automatically inserted by the computer.

It should be noted that the tracer management module 130 has a plurality of specific implementations. In addition to obtaining (or managing) the information collected by the tracer 170, the tracer management module 130 may further manage the tracer 170, for example, start and initialize the tracer 170 at a start stage of the computer system, and perform other operations in some cases, for example, review the tracer. In addition, operations of entering and starting different types of programs may be different.

An audit trigger module 120 is configured to send trigger information to an audit module 140 that is set in the second operating system, to trigger the audit module 140 to start to perform an audit operation on the program 110. Specifically, the audit trigger module 120 compares an audit rule 11 with a control flow obtained by the tracer management module 130, and if the control flow complies with the audit rule 11, continues to perform a subsequent function operation. If the control flow does not comply with the audit rule, it indicates that an exception occurs in execution of the program 110, and a current operation is terminated and/or error information is returned to the first operating system. The audit trigger module 120 may also be a part of the to-be-protected program 110.

The audit rule 11 is stored in the memory 160. There may be a plurality of types of audit rules 11. An automaton is a specific implementation of the audit rule.

It should be noted that, when the trigger information is sent from a domain to another domain, switching between two domains is usually required. A method and a procedure for switching between two domains are related to a system applied to this application. This is not limited in this embodiment.

It can be learned that, according to the method provided in this embodiment, control flow audit may be performed in a domain for an execution procedure of to-be-protected code in another domain, to ensure normal execution of the code. This effectively prevents the code from being bypassed after the domain in which the code is located undergoes permission escalation, thereby avoiding a security vulnerability possibly caused because the code is bypassed. Herein, that a domain undergoes permission escalation means that relatively high or highest permission of the domain is obtained.

Further, if the tracer (or the tracer management module 130) obtains other to-be-audited information in addition to the control flow information, the audit module 140 may process the information together, to further enhance applicability or security of this application.

Embodiment 2

With reference to a TrustZone technology framework and a Linux® operating system, the following uses an example to describe implementations of a control flow audit method and a plurality of other methods that are provided in this application.

Figure 2:
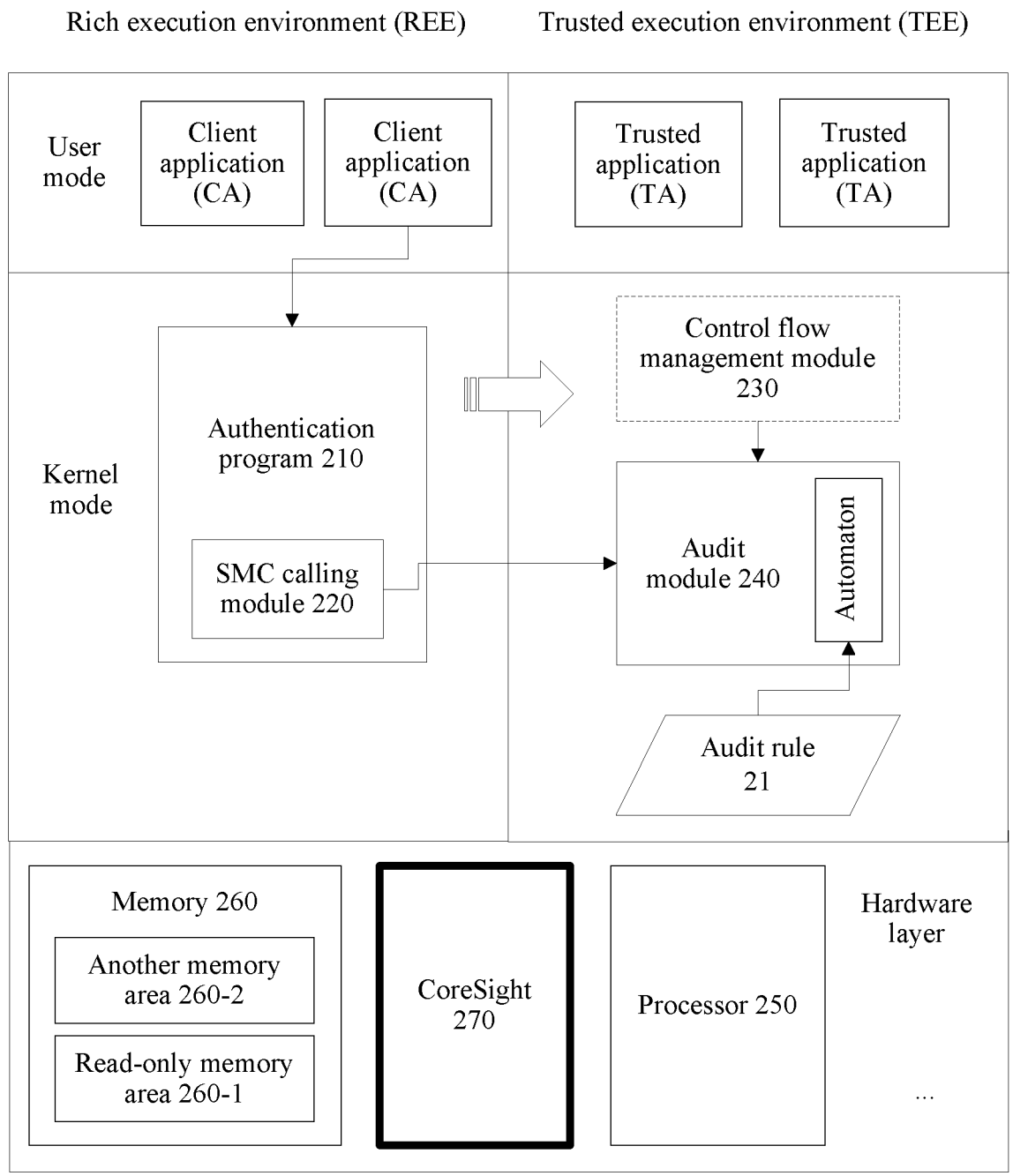
FIG. 2 is a schematic structural diagram of a terminal device according to an embodiment.

FIG. 2 is a schematic structural diagram of an apparatus of a terminal device according to an embodiment. The terminal device includes a hardware layer, and the hardware layer includes a processor 250, a memory 260, and a CoreSight 270. The CoreSight 270 is a typical hardware tracer. The CoreSight 270 is in a started state in an entire or partial running period of the terminal device 200.

The memory 260 includes a read-only memory area 260-1 that is set to be readable only and another memory area 260-2. Certainly, the memory 260 may further include another type of storage medium. For details, refer to the foregoing embodiment. Details are not described herein again.

The terminal device 200 includes two domains: a rich execution environment (rich execution environment, REE) and a trusted execution environment (trusted execution environment, TEE). A Linux® operating system and a TEE-side operating system (for example, an open-source OP-TEE operating system) respectively run in the two domains. The Linux® operating system and the TEE OS each are divided into two states: a user mode and a kernel mode.

In the REE-side user mode, a client application (CA) is set. Before accessing a TEE-side trusted application (TA), the CA needs to call a segment of authentication program 210 in the kernel mode. The segment of code is the to-be-protected program 110 in the foregoing embodiment. In some other embodiments, the code may be alternatively construed as partial code of the CA, and therefore the CA is also an object that can be protected and monitored in this application.

The authentication program 210 is a part of a handshaking program existing before communication is performed between the REE and the TEE. The handshaking program is divided into the following two parts: 1. The REE initiates a handshake. 2. The TEE processes a handshake request and determines whether the handshake succeeds. The authentication program 210 implements the part 1, that is, the REE initiates a handshake. The authentication program 210 mainly includes the following functions: 1. collecting identity information of the CA; 2. constructing a handshake request; 3. checking the identity information and the handshake request to generate a checksum; and 4. sending the identity information of the CA, the handshake request, and the checksum to the TEE. In an existing architecture, the TEE rejects a request that is sent without a handshake procedure.

The handshaking program includes a series of function code and data that needs to be processed. Security attack behavior may find a vulnerability in a function execution sequence, corresponding data, or a combination of a function execution sequence and data. Consequently, execution integrity of the segment of code is broken, causing a subsequent security vulnerability. For example, a forged CA may bypass a procedure of collecting identity information, and send forged identity information that is not of the CA, to impersonate an identity of an authorized CA.

The authentication program 210 in this embodiment is no longer a prior-art authentication program. A plurality of CoreSight trigger instructions are separately inserted at a plurality of locations in the authentication program 210. The trigger instruction is used to trigger the CoreSight 270 to collect information related to code execution. Specifically, the CoreSight trigger instruction may be a segment of program. The program has the following functions: 1. configuring a data transfer register of the CoreSight 270; and 2. enabling the CoreSight 270 to start to collect to-be-audited information. The plurality of locations in the authentication program 210 may be construed as "collection points" for triggering information collection.

In the REE-side kernel mode, an SMC calling module 220 is further set. The module is mainly configured to send, to an audit module 240, a trigger message used to trigger audit. In this embodiment, the SMC calling module 220 is implemented as a part of the authentication program 210, that is, the authentication program 210 sends the trigger message used to trigger audit. In other embodiments, the SMC calling module 220 may be independent of the to-be-protected program.

Figure 3:
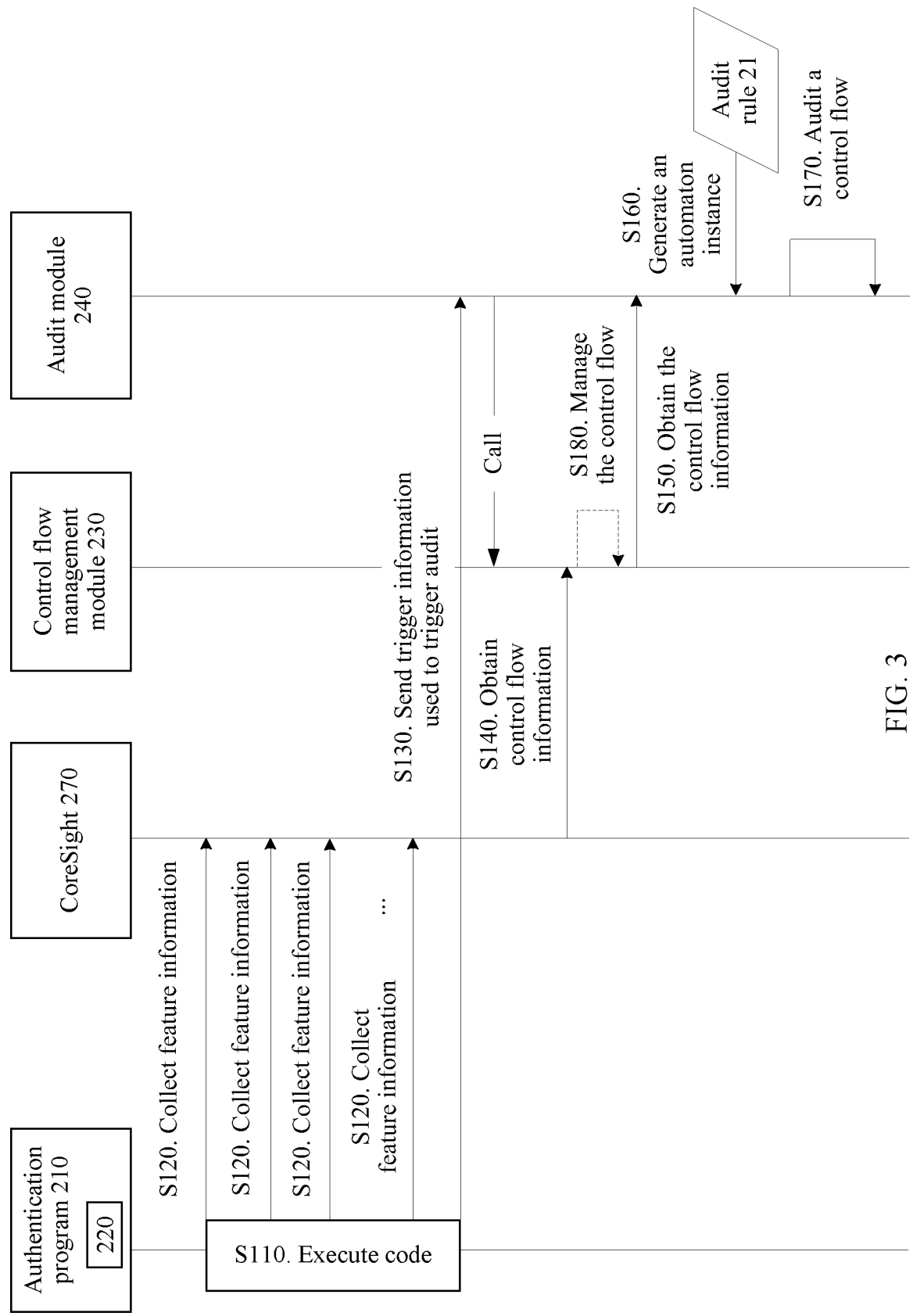
FIG. 3 is a schematic flowchart of a security control method based on FIG. 2.

Fingerprint verification is used as an example. FIG. 3 shows a procedure of control flow integrity audit (briefly referred to as control flow audit below). A user enters a fingerprint of the user during power-on or a payment operation, to activate a CA. The CA calls the authentication program 210, and then execution of the authentication program 210 starts (S110). In an execution procedure of the authentication program 210, a plurality of CoreSight trigger instructions are set in the code. When the program proceeds to each trigger instruction, the CoreSight 270 may perform an operation of collecting feature information (S120), and directly store the information or convert and then store the information as control flow information of the authentication program 270. When the authentication program 210 proceeds to the end, the SMC calling module 220 sends a trigger message to the audit module 240 by using an SMC instruction (S130). Specifically, the trigger message includes identity information of the CA and other content. A location of the SMC calling module 220 may be construed as an "audit point" for triggering audit.

When the SMC calling module 220 sends the trigger message to the audit module 240, switching from the REE to the TEE is required. The SMC (secure monitor call) instruction needs to be called, so that the REE is switched to an intermediate mode of TrustZone first, namely, a monitor mode (Monitor Mode), and then the monitor mode is switched to the TEE. SMC is a basic technology of a TrustZone technology framework, and further implementation is not described herein.

After receiving the trigger information, the audit module 240 obtains the control flow information of the authentication program 210 from the memory 260, or calls a control flow management module 230 to obtain the control flow information (S140 and S150).

Specifically, the control flow management module 230 obtains the control flow information from the CoreSight 270 (S140), and returns the control flow information to the audit module 240 (S150). More specifically, the CoreSight 270 previously stores the control flow information in a storage medium inside the CoreSight 270. The control flow management module 230 reads the control flow information from the storage medium, and directly stores the control flow information in the memory 260, or stores the control flow information in the memory 260 after performing specific processing on the control flow information, or directly returns the control flow information to the audit module 240. In some other embodiments, the control flow management module 230 and the audit module 240 may be alternatively integrated into one module.

The audit module 240 further obtains, according to the audit rule 241, an automaton used to audit the control flow. Specifically, the audit module 240 generates an automaton instance according to the audit rule 241 (S160). The audit module 240 inputs the control flow information or information obtained through conversion into the automaton instance to audit the control flow (S170). After the audit succeeds, the audit module 240 returns a result to the REE side. The REE continues to send information about the fingerprint entered by the user to the TEE, and then a TA on the TEE side verifies the information about the fingerprint. For example, the TEE side calls an authentication TA to verify whether the information about the fingerprint has matched information in a preconfigured authorized identity information library. If there is matched information, the TEE returns, to the REE side, information indicating that the fingerprint verification succeeds. If the audit fails, the TEE terminates a current handshake, and returns, to the REE, a message indicating that the handshake fails, or returns, to the REE, information indicating a security problem.

The automaton may be construed as a function implemented by using software code. An attribute of the function includes a two-dimensional array. Each element in the array represents a state of the automaton. For example, if a value in a row x and a column y is v, automaton code is expressed as follows: If the automaton is currently in a state x and a current input is an event y, the state of the automaton is switched to v. Each state has respective attributes: "initialization" and "termination". There is only one state with the attribute "initialization", and there may be a plurality of states with the attribute "termination". The automaton instance is a specific runtime automaton instance created based on the foregoing automaton (which may be construed as a template). A state of the automaton instance at the beginning of creating the automaton instance is a state with the attribute "initialization". A method in which the audit module 240 performs audit by using the automaton is specifically as follows: converting the obtained control flow information into an event sequence; driving, by using the event sequence, the automaton instance to perform state switching; and after all events are input, checking a state of the automaton. If the state is a state with the attribute "termination", the audit succeeds; or otherwise, the audit fails.

The control flow management module 230 may manage, for example, preprocess and store, the control flow information (S180). In some other embodiments, the steps (S140 and S180) in which the control flow management module 230 obtains the control flow information from the CoreSight 270 and manages the control flow information may not require triggering and calling of the audit module 240. In other words, before the audit module 240 is triggered, the control flow management module 230 obtains the control flow information from the CoreSight 270 and stores the control flow information in the memory 260.

It can be learned that, before the secure application TA is called, the audit module 240 on the TEE side audits the control flow of the authentication program 210, and the TA is actually called only after the audit succeeds (that is, the authentication program 210 is reliably executed). This can effectively prevent an unauthorized CA from bypassing the authentication program 210. If execution of the authentication program 210 is not complete, identity information of an unauthorized CA cannot be normally obtained, and further the unauthorized CA can send, to the TEE side, forged identity information that is not of the unauthorized CA but can be successfully verified. Then the TEE side successfully verifies the unauthorized CA based on the forged identity information. Consequently, the unauthorized CA can communicate with the TEE side, causing a system security vulnerability.

Further, in this embodiment, a memory area may be divided at a start stage of the terminal device to obtain the read-only memory area 260-1. The authentication program 210 is loaded into the read-only memory area 260-1, to prevent the code of the authentication program 210 from being tampered with. This further ensures security of the terminal device.

Embodiment 3

It can be learned from the descriptions of the foregoing embodiment that, a CoreSight 270 is configured to collect control flow information (and other to-be-audited information). Therefore, security of the CoreSight 270 is a basis of a system. To further ensure security, before any module on a TEE side reads data from a storage medium of the CoreSight 270, the CoreSight 270 needs to be reviewed.

Figure 4:
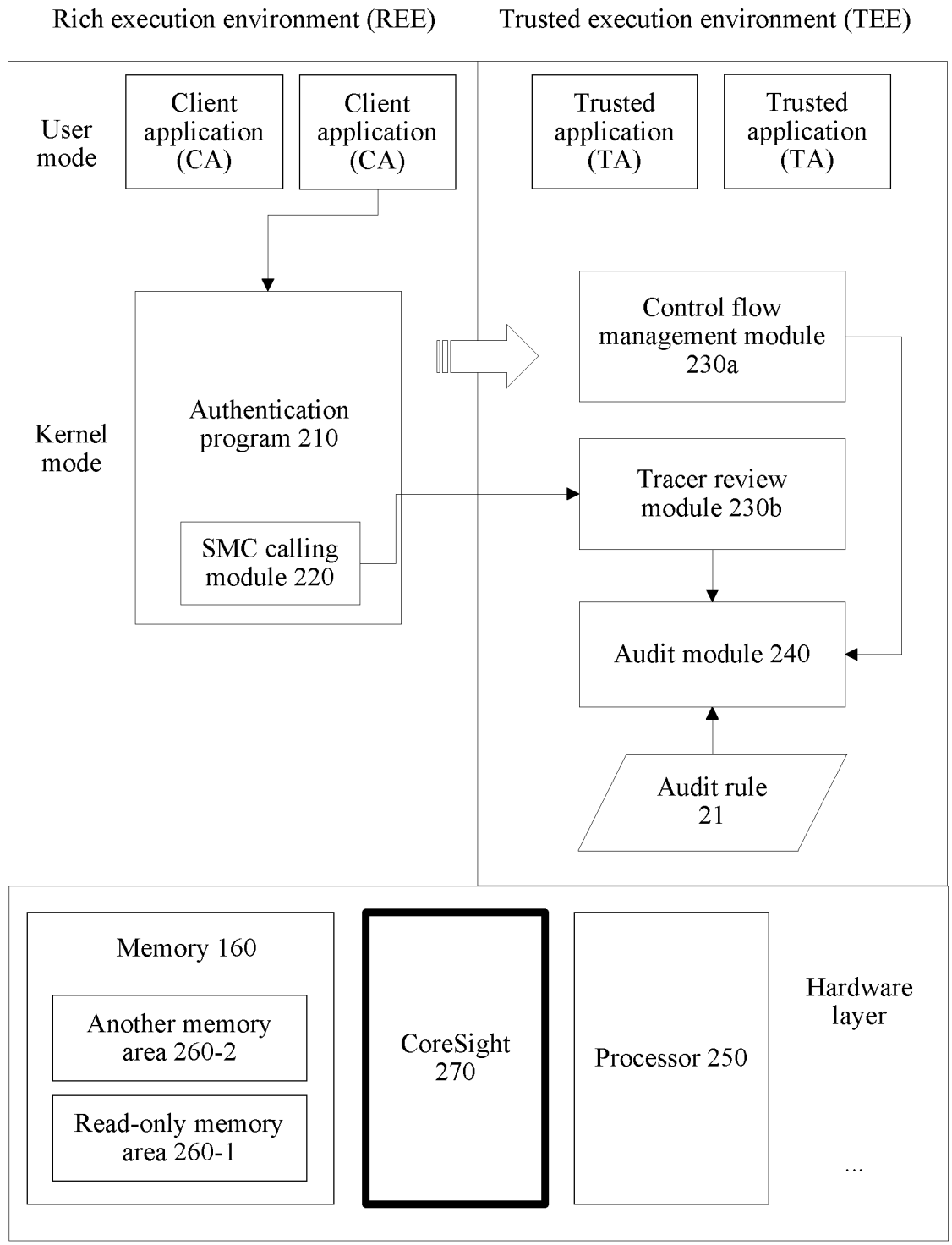
FIG. 4 is a schematic structural diagram of a terminal device according to an embodiment.

Referring to FIG. 4, a tracer review module 230b is added based on FIG. 3, to review the CoreSight 270. Referring to a dotted-line block shown in FIG. 5, an SMC calling module 220 sends a trigger message to the tracer review module 230b (S130). The tracer review module 230b first reviews the CoreSight 270 (S130a), and only after the review succeeds, sends, to an audit module 240, a message indicating that the review succeeds (S130b), to trigger the audit module 240 to perform a subsequent operation.

Reviewing the CoreSight 270 mainly means determining whether a register of the CoreSight 270 has been modified. Specifically, a current value of the register and an initial value that is of the register and that exists when the CoreSight 270 is initialized are obtained, and then the two values are compared. If the two values are the same, the review succeeds; or otherwise, the review fails. The reviewed "register" herein may include all registers of the CoreSight 270 or any one or more key registers of the CoreSight 270.

The "initial value" is already set when the CoreSight is designed, and is written into start code. The "initial value" recorded in the code is obtained during the review, and then the initial value is compared with the current value.

Figure 5:
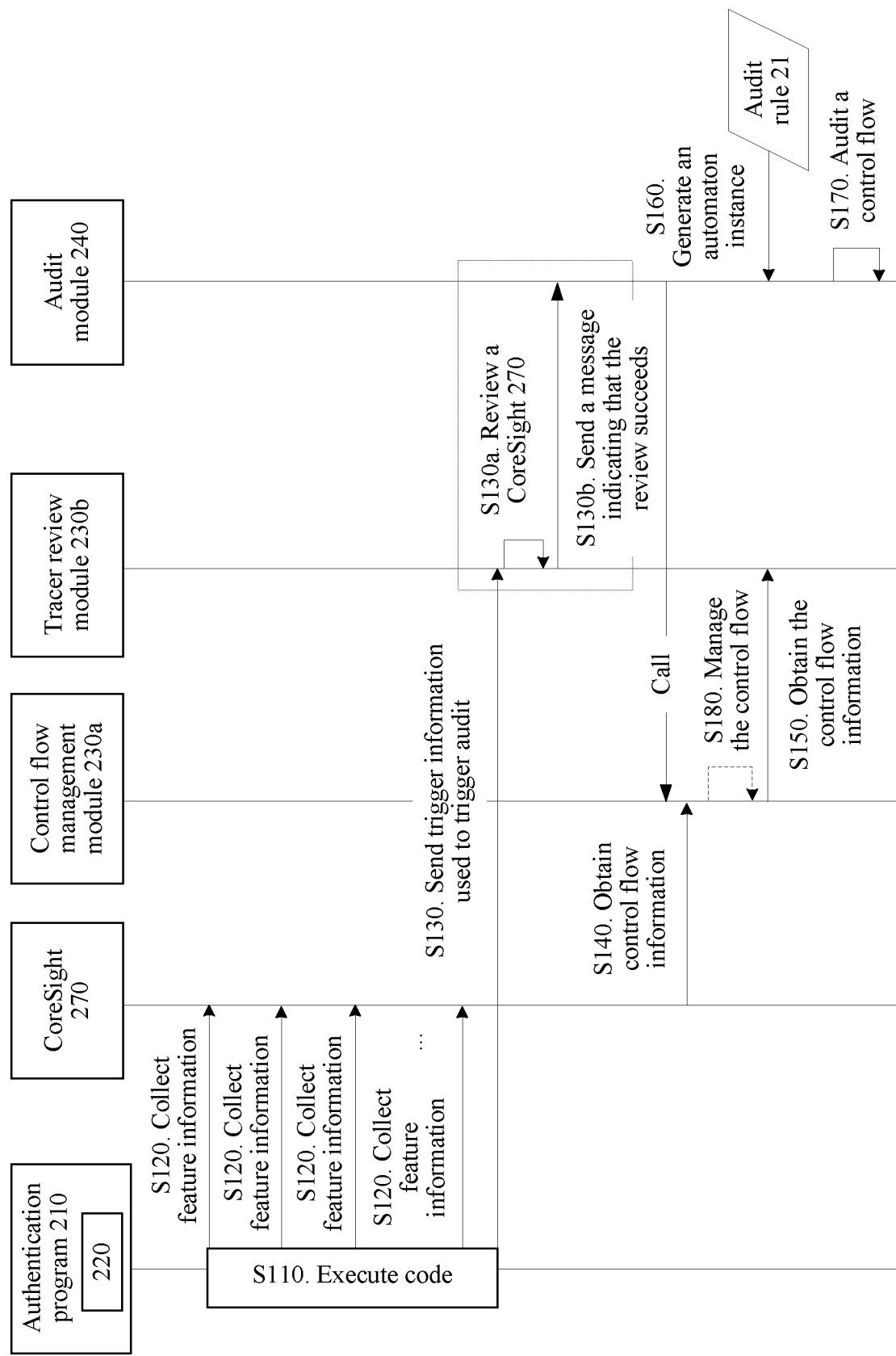
FIG. 5 is a schematic flowchart of a security control method based on FIG. 4.

Other steps in FIG. 5 are similar to those in FIG. 3. For details, refer to the foregoing descriptions. Details are not described herein again.

In some other embodiments, the audit module 240 may still receive a trigger message, as shown in FIG. 3, and then optionally call the tracer review module 230b. In other words, the audit module 240 can determine whether the CoreSight 270 needs to be reviewed.

It can be learned that, according to the foregoing method, reviewing the CoreSight 270 before audit is performed can improve trustworthiness of an entire audit procedure, thereby further improving system security.

Embodiment 4

This application further provides a parallel audit method, to audit, in parallel by using one tracer, control flows of a plurality of to-be-protected programs in a scenario in which the plurality of to-be-protected programs simultaneously run. The parallel audit method may be implemented in combination with any of the foregoing embodiments.

Figure 6:
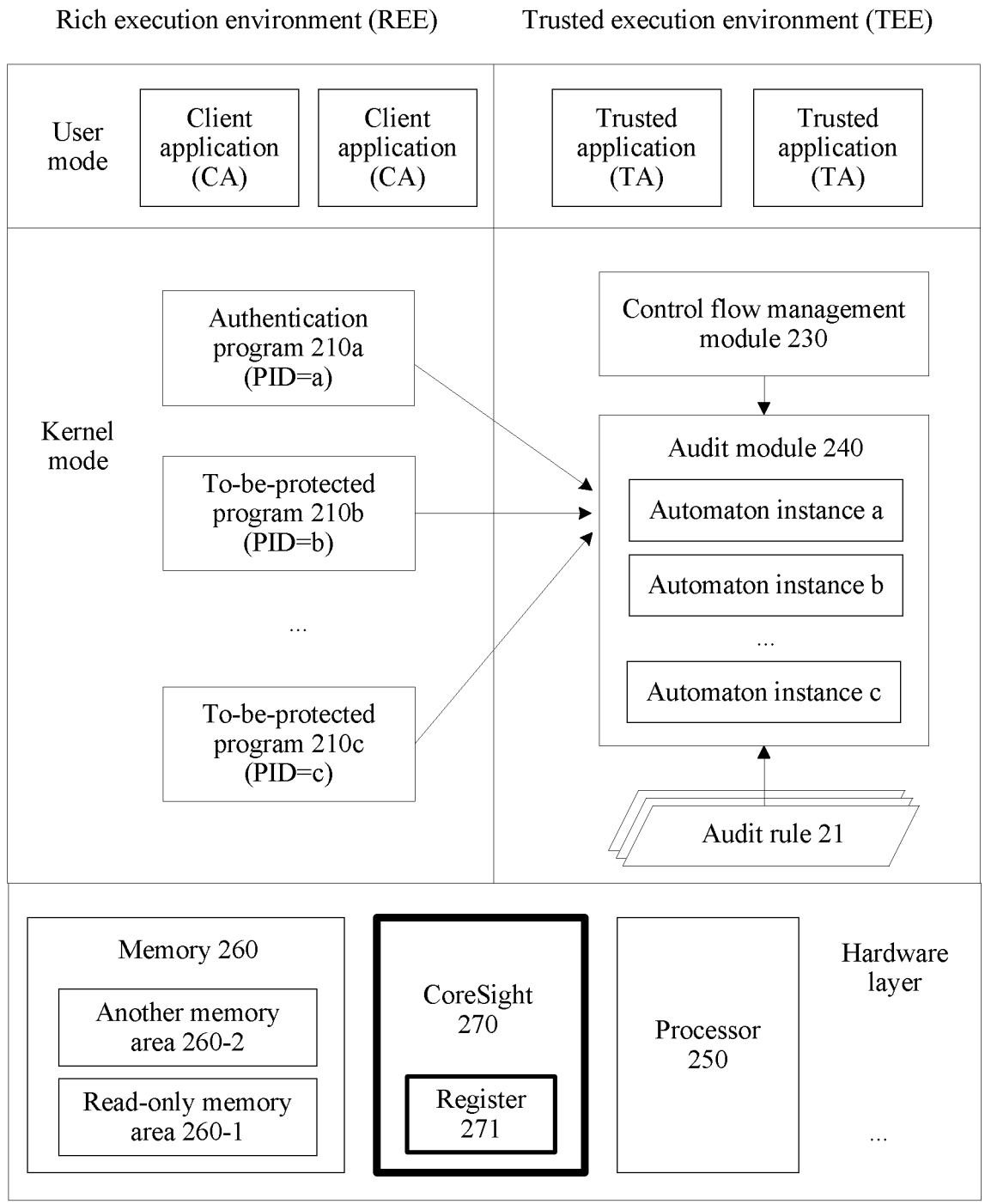
FIG. 6 is a schematic structural diagram of a terminal device according to an embodiment.

FIG. 6 is a schematic diagram of an apparatus of a parallel audit method according to an embodiment. A register 271 is set in the CoreSight 270, and any value may be written into the register by using software. There are to-be-protected programs 210a, 210b, and 210c on a REE side. The to-be-protected program 210a is the authentication program 210 in the foregoing embodiment, and the to-be-protected programs 210b and 210c are other code. This is not limited in this embodiment. An audit module 240 includes three automaton instances a, b, and c. For other modules, refer to descriptions of the foregoing embodiment.

Different from FIG. 3, the programs 210a, 210b, and 210c are respectively executed by three processes PID=a, PID=b, and PID=c. When the program proceeds to a CoreSight 270 trigger instruction, the CoreSight 270 trigger instruction triggers the CoreSight 270 to obtain a PID (process identification) of a process that executes a current program, and write the PID into the register 271. When the CoreSight 270 trigger instruction triggers the CoreSight 270 to collect information, not only control flow information of the collection point is collected, but also a value that is of the PID stored in the register 271 and that exists when the control flow information is generated is read from the register 271. The value and the control flow information are associated and stored as to-be-audited information. When any one of the programs 210a, 210b, and 210c proceeds to an audit point for triggering audit (for example, S130 in FIG. 3), the audit module 240 on a TEE side is triggered to perform audit. Similar to the embodiment shown in FIG. 5, the CoreSight 270 may be reviewed before audit is performed.

It should be noted that, code for obtaining and writing a PID of a process may be construed as one or more process identification obtaining modules, and is not shown in the figure.

In the foregoing manner, each piece of control flow information and a process for generating the control flow information are stored, so that audit is separately performed subsequently for different control flow information by using different automaton instances.

After audit is triggered, the audit module 240 obtains the to-be-audited information, searches for or creates a matched automaton instance based on the PID in the to-be-audited information, and inputs the control flow information in the to-be-audited information into the automaton instance. Each automaton instance is used to audit a control flow of each to-be-protected program.

Figure 7:
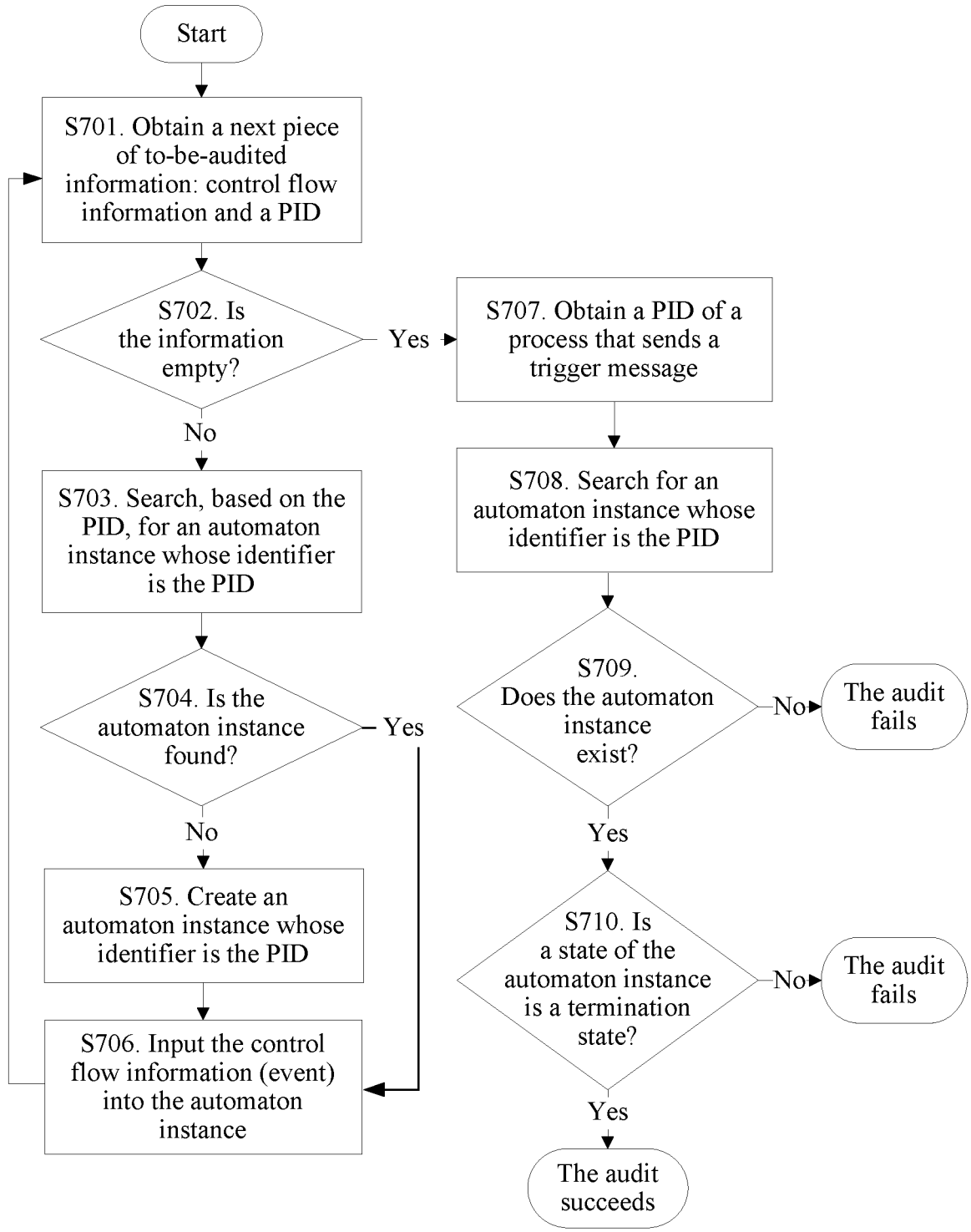
FIG. 7 is a schematic flowchart of an audit method based on FIG. 6.

In an implementation, as shown in FIG. 7, the audit module 240 obtains a next piece of control flow information from all to-be-audited information, where the piece of to-be-audited information includes control flow information and a PID (S701). For a manner in which the audit module 240 directly or indirectly obtains the to-be-audited information from the CoreSight 270, refer to the foregoing embodiment. After obtaining the to-be-audited information, the audit module 240 determines whether the to-be-audited information is empty (S702). If the to-be-audited information is not empty, the audit module 240 searches for a matched automaton instance based on the PID in the to-be-audited information (S703). The audit module 240 determines whether the automaton instance is found (S704). If no automaton instance is found, the audit module 240 creates an automaton instance whose identifier is the PID (S705). If finding the automaton instance or after creating the automaton instance, the audit module 240 inputs the control flow information into the automaton instance (S706), to push the automaton instance one step further. Then the audit module 240 goes back to step S701.

If the audit module 240 determines that the obtained to-be-audited information is empty in step S702, that is, after all the current to-be-audited information is processed according to the foregoing method, the audit module 240 obtains a PID of a process that sends a message for triggering current audit (S707). Specifically, when a CA on the REE side performs cross-domain calling, the CA usually stores, in shared memory, a PID of a process of the CA, an identifier and a parameter of a TA that the CA expects to call, and the like. In this way, a module on the TEE side can obtain, from the shared memory, a value of the PID of the process. The audit module 240 searches for an automaton instance whose identifier is the value of the PID (S708). If the automaton instance does not exist (S709), the current audit fails. If the automaton instance exists (S709), the audit module 240 determines whether the automaton instance is currently in a state with an attribute "termination" (briefly referred to as a termination state). If yes, the audit succeeds; or if no, the audit fails.

In another implementation, the audit module 240 first obtains a PID of a process that sends a message for triggering current audit; obtains, from to-be-audited information, to-be-audited information including a same PID; and then performs the following operations on each piece of obtained to-be-audited information: searching for a matched automaton instance based on the obtained PID; and if no matched automaton instance is found, creating an automaton instance whose identifier is the PID; or if the matched automaton instance is found, inputting the to-be-audited information into the automaton instance. After all the to-be-audited information is processed, if the automaton instance is in a state with an attribute "termination", the audit succeeds; or otherwise, the audit fails.

It should be noted that in this embodiment, an automaton instance matching (or referred to as "corresponding to") each piece of to-be-audited information is an automaton instance whose identifier is a PID. The PID is a value of a PID included in the to-be-audited information. For example, for to-be-audited information corresponding to PID=a, an automaton instance matching the to-be-audited information is an automaton instance whose identifier is a. In some other embodiments, a PID of a process of the to-be-protected program is not necessarily totally the same as an identifier of a corresponding automaton instance. Even though the PID is different from the identifier, if a correspondence between the PID and the identifier is stored or a conversion relationship between the PID and the identifier is known, this embodiment can also be implemented.

According to the foregoing parallel audit method, in the control flow audit method provided in this embodiment, a plurality of to-be-protected programs can be simultaneously audited in a terminal device having only one tracer, thereby improving audit efficiency and broadening an applicable scenario of the method.

Embodiment 5

To further reduce a possibility that a to-be-protected program is snooped, this embodiment provides a control flow audit method with reference to a random number.

Figure 8:
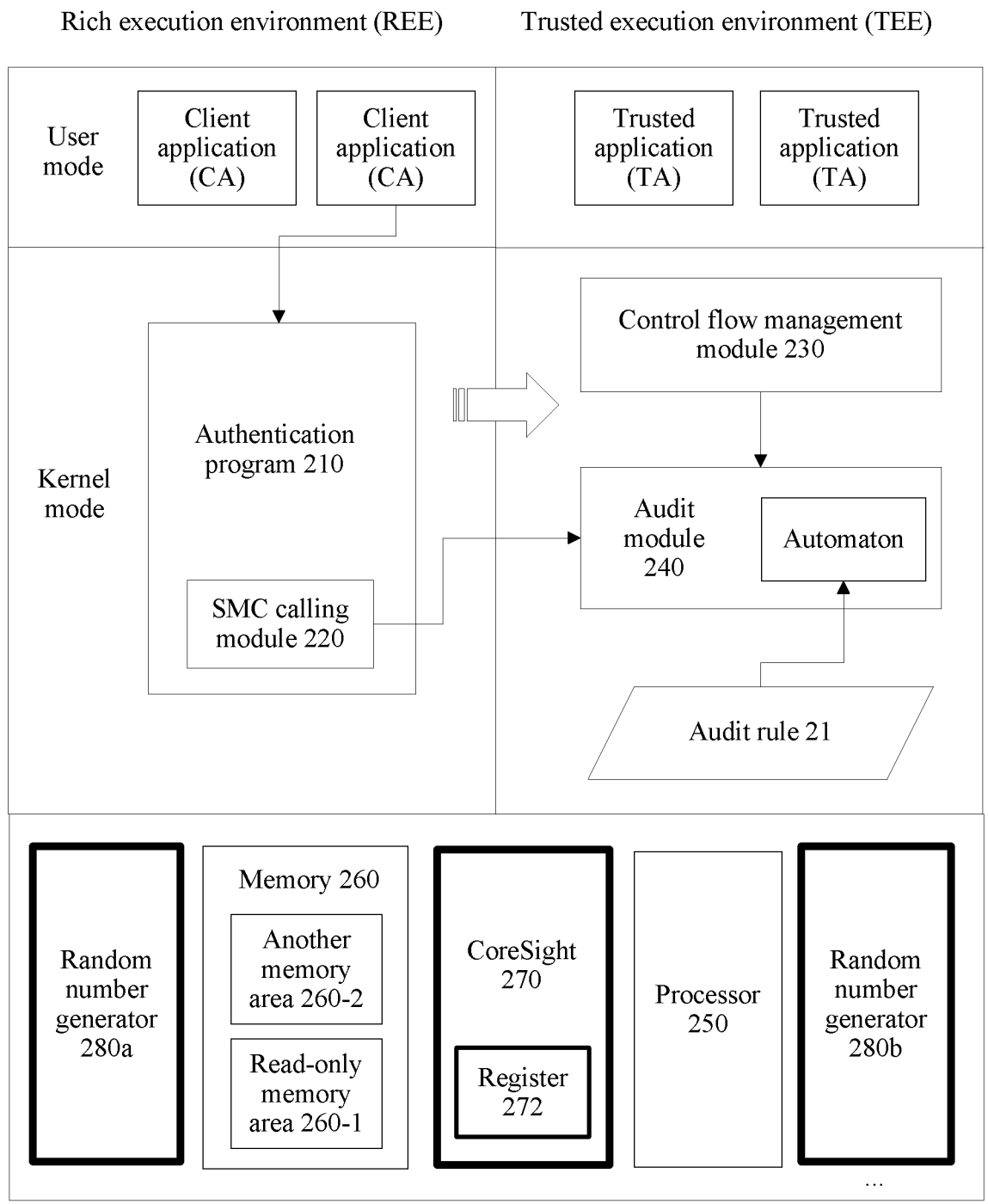
FIG. 8 is a schematic structural diagram of a terminal device according to an embodiment.

FIG. 8 is a schematic structural diagram of a terminal device according to an embodiment. The terminal device includes two hardware (pseudo) random number generators 280*a* and 280*b*. The two random number generators are respectively divided to a REE side and a TEE side by using a hardware division mechanism of TrustZone. To be specific, the random number generator 280*a* may be accessed by the REE side (where the TEE side may or may not access the random number generator 280*a*), and the random number generator 280*b* may be accessed only by the TEE side. In addition, a register 272 is further set in a CoreSight 270. Any value may be written into the register by using software. Each record generated by the CoreSight 270 is accompanied by a value that is of the register and that exists when the record is generated.

In the foregoing embodiment, it is mentioned that a state of an automaton has two attributes: "initialization" and "termination". In this embodiment, during design of the automaton, two attributes "data transmission" and "a quantity of random number generator access times" are added to each state, or the two attributes are added to one or more states thereof as required.

A plurality of locations are selected from an authentication program 210 based on an execution procedure of the authentication program 210. The plurality of locations are referred to as "random number generation points". Code is inserted at the random number generation points. The inserted code is used to call the random number generator 280*a* to generate a random number and write the random number into the register 272 of the CoreSight 270. In this way, when the authentication program 210 is executed, each time the program proceeds to a random number generation point, the random number generator 280*a* is called once, and a generated random number is written into the register 272.

Figure 9:
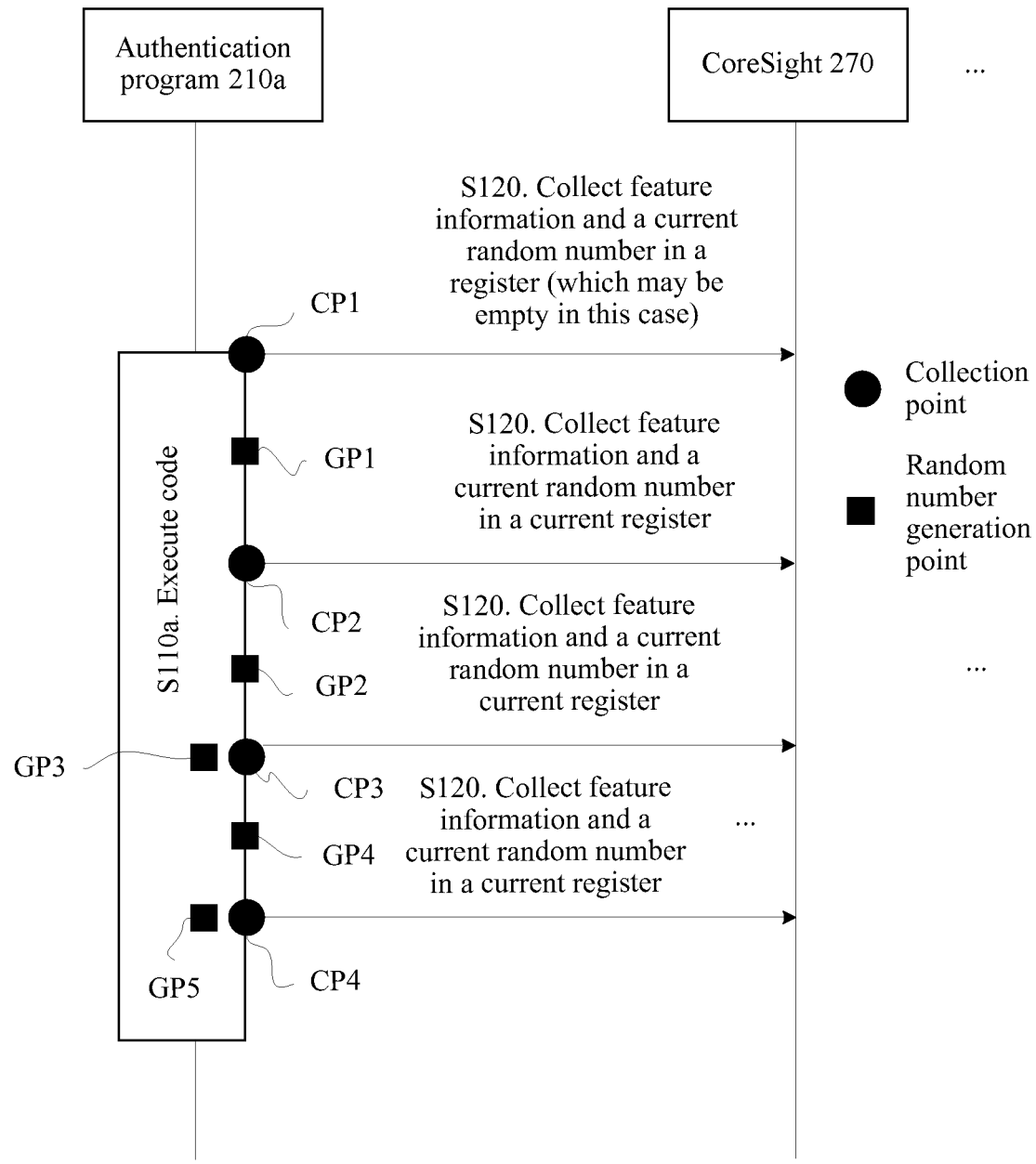
FIG. 9 is a schematic diagram of collecting information by a tracer based on FIG. 8.

In the foregoing embodiment, CoreSight trigger instructions are inserted at a plurality of locations in the authentication program 210, to trigger the CoreSight 270 to collect control flow information (referring to FIG. 3). The plurality of locations may be referred to as "collection points". The "random number generation points" and the "collection points" that are mentioned in this embodiment may totally overlap, or may partially overlap, or may not overlap at all. When a random number is generated at a "point" that is not a "collection point", the random number is collected by the CoreSight 270 along with data at a next adjacent "collection point", and is further obtained by the TEE side. As shown in FIG. 9, the authentication program 210 includes at least four collection points (indicated by circles) CP1 to CP4 and at least five random number generation points (indicated by quadrates) GP1 to GP5. GP3 overlaps CP3, and GP5 overlaps CP4. If overlapping occurs at a location, as shown in the figure, a random number generation instruction at the location is usually before a CoreSight trigger instruction. When the authentication program 210 proceeds to the non-overlapping random number generation point GP1, the random number generator 280*a* is called to generate a random number R1, and write the random number into the register 272. Then, when the authentication program 210 proceeds to the collection point CP2, the CoreSight 270 is triggered to collect the control flow information and the current random number R1 in the register 272 (referring to step S120 in FIG.

9), to use the control flow information and the current random number R1 as one piece of to-be-audited information.

After the random number generation points are set, when the automaton is coded, a quantity of random number generation points that are passed when the automaton proceeds to each state is manually or automatically calculated. The attribute "a quantity of random number generator access times" of each state is set based on the quantity. For example, still referring to FIG. 9, four collection points CP1 to CP4 are passed when the program is executed, and are respectively corresponding to four events E1 to E4. According to an execution procedure, the automaton may be coded as: (S0)-E1→(S1)-E2→(S2)-E3→(S3)-E4→S4. In this case, values of attributes "a quantity of random number generator access times" of S0 and S1 are 0. Because there is the random number generation point GP1 between E1 and E2, a value of an attribute "a quantity of random number generator access times" of S2 is 1. By analogy, values of attributes "a quantity of random number generator access times" of S3 and S4 are respectively 3 and 5.

According to the foregoing example, on the REE side, before the termination state S4, a random number is generated at GP5 for the last time. The random number needs to be recorded, and to-be-audited information corresponding to CP4 carries the random number. The to-be-audited information includes control flow information E4 (or construed as an "event") and the random number (referring to FIG. 9). Therefore, a value of an attribute "data transmission" of the state S4 after E4 may be set to 1, so that the random number that is last generated on the REE side is recorded on the TEE side based on the attribute in a subsequent automaton instance running procedure. Values of attributes "data transmission" of other states may be randomly set. Certainly, the manner of setting a value to 1 or a value other than 1 or to true or false is only an example. Other setting manners readily figured out by persons skilled in the art according to essence of this implementation also fall within the protection scope of this application.

According to the foregoing embodiment, after an audit module 240 is triggered, an automaton instance is generated, and the automaton instance is driven, based on the obtained to-be-audited information, to perform state switching to audit a control flow. In this embodiment, the automaton instance has the following change: The automaton instance has a variable V, used to record a random number. A state switching rule has the following change: After the to-be-audited information is received and a state is pushed forward, if a value of an attribute "data transmission" of a state obtained after the pushing is not 1, a random number carried in the to-be-audited information is ignored; or if the value is 1, the random number is assigned to the variable V. When the audit is completed, if the automaton instance is not in a termination state, the audit fails; or if the automaton instance is in a termination state, n random numbers are obtained from the random number generator 280b at a time, where n is a value of an attribute "a quantity of random number generator access times" of the termination state; and an $n^{th}$ random number is compared with the value of the variable V. If the two values are the same, the audit succeeds; or if the two values are different, the audit fails.

Figure 10:
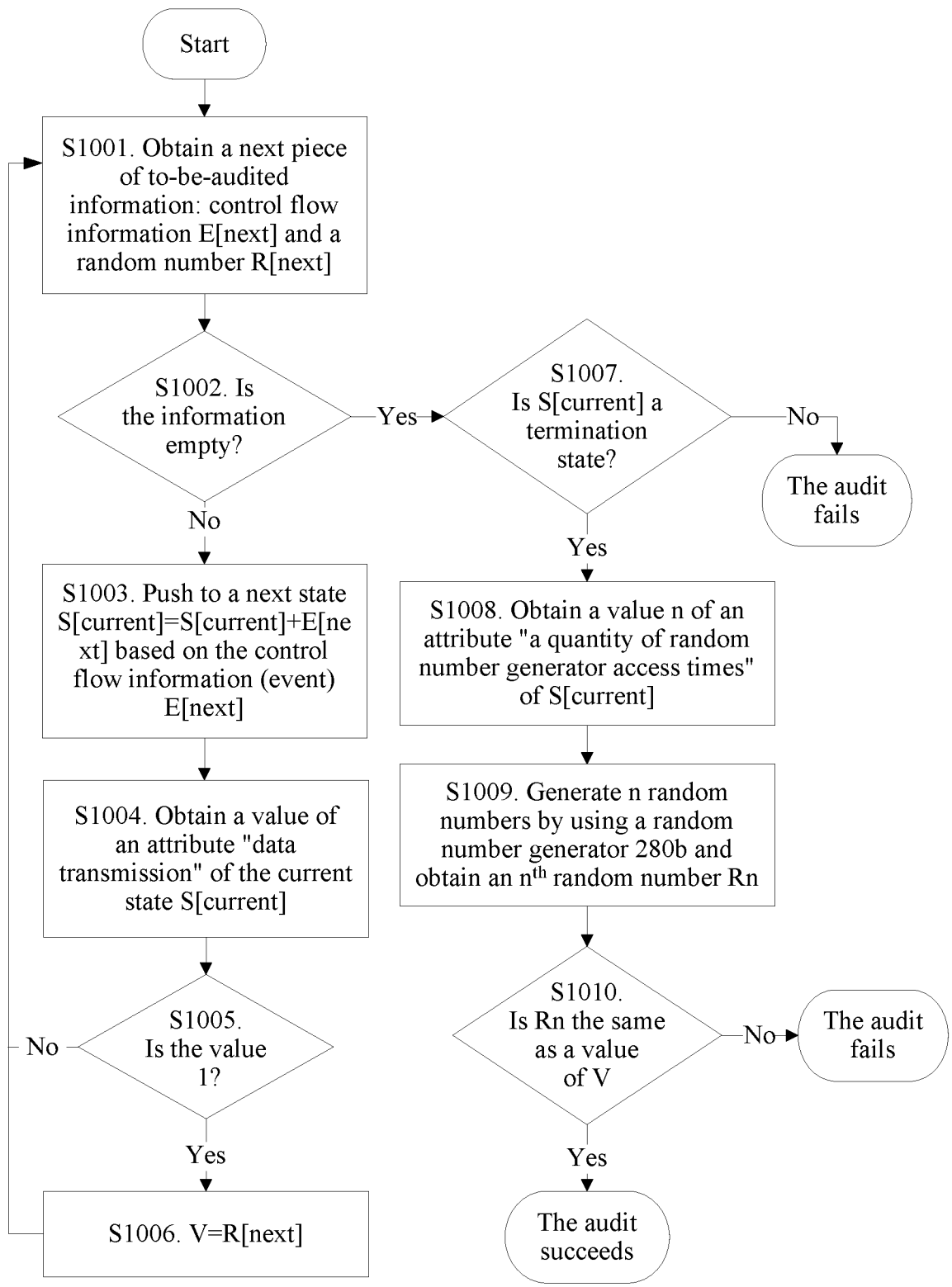
FIG. 10 is a schematic flowchart of an audit method based on FIG. 8 and FIG. 9.

Specifically, as shown in FIG. 10, any automaton instance in the audit module 240 performs the following steps: obtaining a next piece of to-be-audited information (S1001), where the to-be-audited information includes control flow information E[next] and a random number R[next]; determining whether the to-be-audited information is empty (S1002); if the to-be-audited information is empty, it indicates that all to-be-audited information has been processed; or if the to-be-audited information is not empty, pushing the automaton instance to a next state S[current] based on E[next] and S[current] (S1003); obtaining a value of an attribute "data transmission" of the state S[current] obtained after the pushing (S1004); determining whether the value is 1 (S1005); and if the value is not 1, going back to S1001; or if the value is 1, assigning the random number R[next] to the variable V (S1006). After all the to-be-audited information has been processed, the automaton instance determines whether S [current] is a termination state (S1007). If no, the audit fails. If S[current] is a termination state, the automaton instance obtains a value n of an attribute "a quantity of random number generator access times" of S[current] (S1008); calls, based on n, the random number generator 280b to generate n random numbers, and records an $n^{th}$ random number Rn (S1009); and determines whether Rn is the same as a current value of the variable V (S1010). If Rn is the same as the current value of the variable V, the audit succeeds; or otherwise, the audit fails.

In other implementations, the attribute "data transmission" may alternatively not be set, that is, the variable V may be used to record each random number, and each record overwrites a previous value.

It should be noted that this embodiment is intended to match a random number V that is generated for the last time in a normal execution procedure of to-be-protected code on the REE side and the random number Rn generated on the TEE side. Rn is generated based on the preset quantity n of random number generator access times of a termination state of an automaton in the execution procedure. To achieve the objective, there may be various possible changes during design of a specific solution. For example, in a state switching rule of the automaton instance, if an attribute "data transmission" of a current state is first determined and then the current state is pushed to a next state, according to the foregoing example, an attribute "data transmission" of the state S3 should be set to 1, so that the random number that is generated for the last time is recorded. Such changes are readily figured out by persons skilled in the art, and are not listed one by one in this application.

If only the automaton is used, it can be only ensured that one process calls all points that should be called, but cannot be ensured that these points are called only by the process. If another process preempts to call some security procedures, this cannot be found through audit only by using the automaton. The another process may preempt only to steal some data or inject some forged data, and may not trigger cross-domain calling. The abnormal behavior of the another process cannot be found through audit by using the automaton. However, if the another process calls the "random number generation point", a random number sequence changes, and the automaton finds that random numbers are not matched, and further finds that the procedure is interfered with. Therefore, in the foregoing manner, the TEE side may find in a timely manner whether a REE-side process is interfered with, thereby further improving system security.

Embodiment 6

In the foregoing embodiment, the control flow audit method is described, so that a case in which a to-be-protected program is modified or bypassed can be detected to a large extent, thereby finding a system problem in a timely manner and avoiding a system vulnerability. The following describes an embodiment in which an identity may also be audited when a control flow is audited, to further improve security.

When a (static) program is stored in a medium, code and static data (also referred to as a constant) of the program are placed in a storage area. The storage area is referred to as a text segment in some systems. A (dynamic) program is run by a process. A virtual memory technology enables each process to exclusively occupy entire memory space. An address starts from zero to an upper limit of memory. Each process divides the space (from a low address to a high address) into a plurality of parts. One of the parts is a text segment, and the segment of memory includes code and static data (namely, a constant) of the entire program.

The text segment of the process includes all instructions of a program executed by the process. Compared with a process PID or a process name, it is more difficult to forge the text segment. Therefore, in this embodiment, this segment of content is construed as an "identity" of the process, and audit of this part of content is referred to as "identity" audit.

Figure 11:
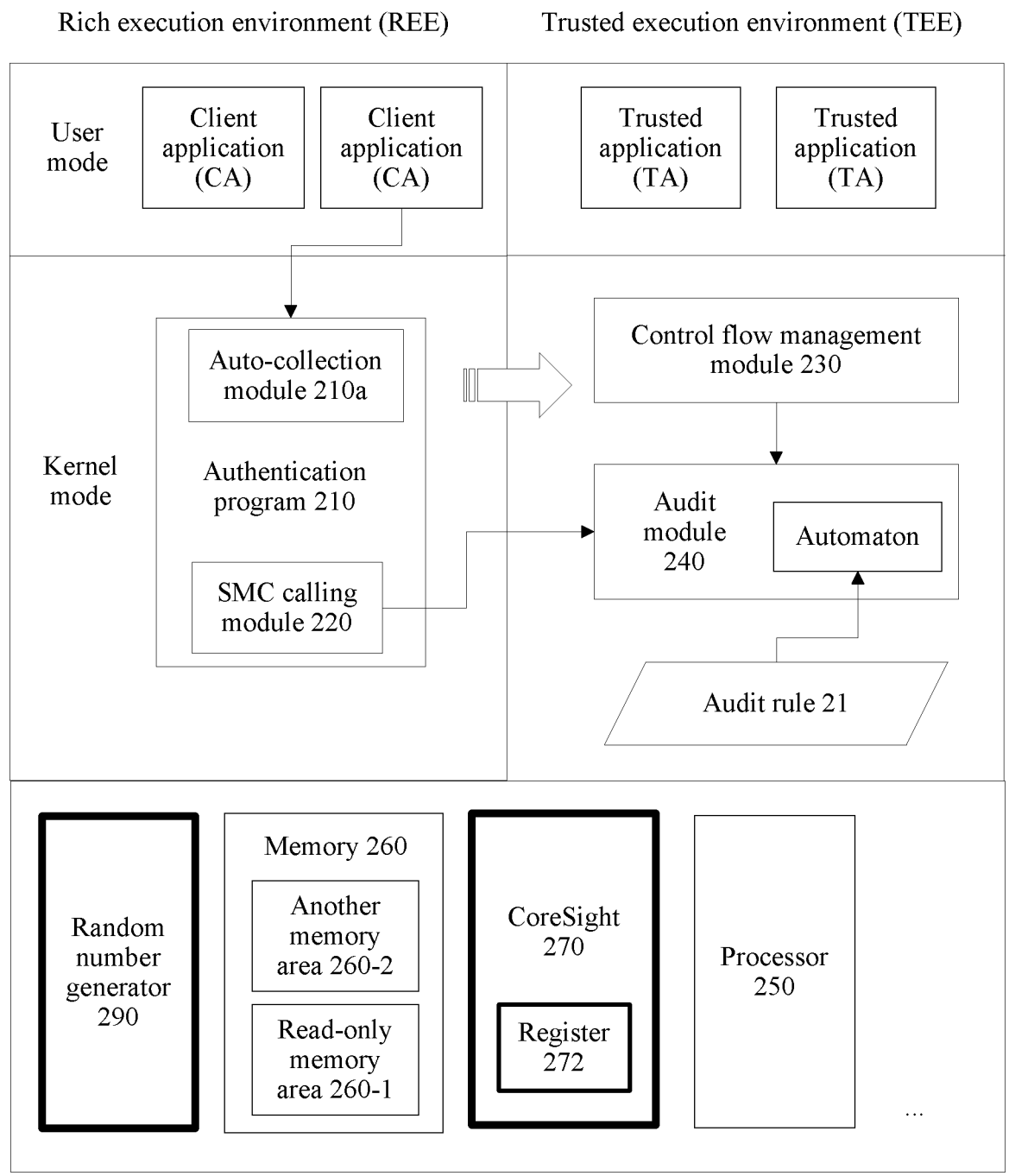
FIG. 11 is a schematic structural diagram of a terminal device according to an embodiment.

FIG. 11 is a schematic structural diagram of a terminal device according to an embodiment. The terminal device includes one hardware (pseudo) random number generator 290. The random number generator 290 is divided to a REE side by using a hardware division mechanism of TrustZone. In addition, a register 272 is further set in a CoreSight 270. Any value may be written into the register by using software. Each record generated by the CoreSight 270 is accompanied by a value that is of the register and that exists when the record is generated.

In addition to two attributes "initialization" and "termination", in this embodiment, during design of an automaton, an attribute "data transmission" is added to each state, or the attribute is added to one or more states thereof as required.

As shown in FIG. 11, an authentication program 210 includes an auto-collection module 210a. The auto-collection module 210a is configured to call the random number generator 290 to generate a random number, write the random number into the register 272 of the CoreSight 270, and generate a segment of scrambled data flow. Content of the scrambled data flow is as follows: splicing the generated random number and a text segment of a current process on the REE side, where a splicing manner is that the random number is placed before the text segment, and performing a hash operation (for example, an SHA-256 algorithm) on data obtained through splicing, to obtain a hash value H1. After completing calculation of a flow header including the random number, the auto-collection module 210a overwrites the random number with other data. If the random number needs to be used for calculation, the random number needs to be read into the register, or may be even written into memory. Therefore, "overwriting" herein is to remove a value of the random number from the register or the memory, to prevent a hacker from using the value.

In some other embodiments, the random number may be placed after the text segment. An advantage of placing the random number before the text segment is as follows: In actual processing, it is not necessary to first perform splicing and then perform calculation, and the calculation may be performed in a streaming manner. If the random number is placed before the text segment, calculation related to the random number can be completed as quickly as possible, so that the value of the random number is removed from the memory or the register.

In some other embodiments, a spliced part may not be original content of the text segment, but may be a compressed text segment or a digest of content included in the text segment. An algorithm for calculating the digest may be, for example, SHA-256 or MD5.

Figure 12:
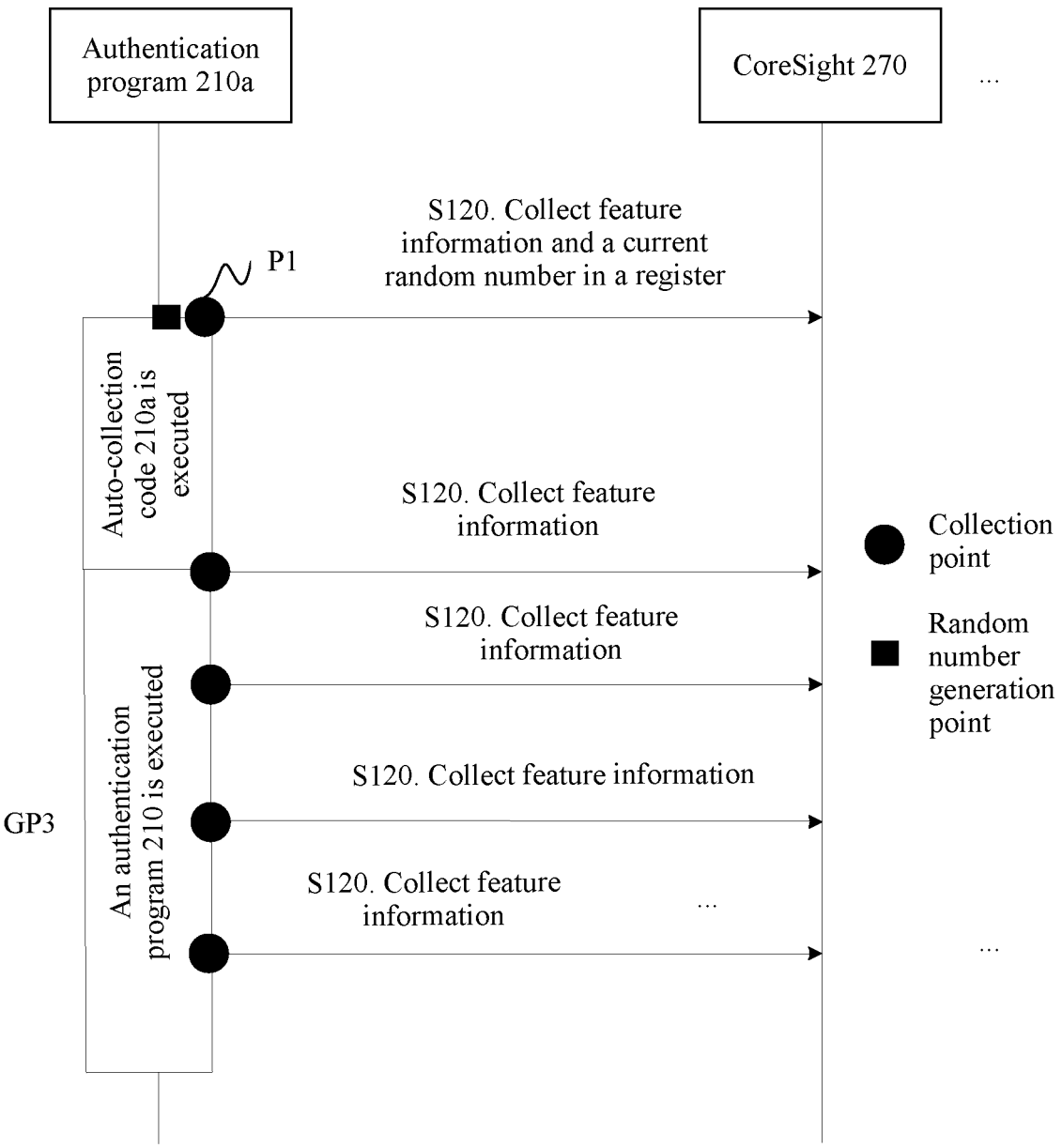
FIG. 12 is a schematic diagram of collecting information by a tracer based on FIG. 11.

As shown in FIG. 12, code of the auto-collection module 210a is set before a location that is in the authentication program 210 and at which the CoreSight 270 is triggered for the first time in the foregoing embodiment. Alternatively, the segment of code 210a together with the authentication program 210 may be construed as a to-be-protected program. Because the segment of code 210a is also a to-be-protected program, a collection point (not shown in FIG. 11) may also be set inside the auto-collection module 210a.

In addition, an authorized text segment of the REE-side process is replicated on a TEE side. Specifically, in a version release procedure, when a TEE-side operating system is compiled, all content included in the text segment on the REE side is placed in the TEE-side operating system through hardcoding.

It should be noted that in this embodiment, it is assumed that all authorized CAs in the system that can be run on the REE side are known in advance. A CA is a segment of program, and is a runtime process. The text segment herein is text segments of all the authorized CAs. Therefore, "the text segment on the REE side" is the prepared text segments of all the authorized CAs, and includes code and a constant of each CA.

In some other embodiments, the compressed text segment or the digest of the original content of the text segment may be placed on the TEE side through hardcoding.

As shown in FIG. 12, the auto-collection module 210a is first executed, and an entrance of the code is set as a "collection point" (P1), to trigger the CoreSight 270 to collect control flow information and a random number in the register 272. The random number is the random number that is generated and written into the register 272 by the auto-collection module 210a. Because the auto-collection module 210a also generates the random number and writes the random number into the register 272, the collection point is also a random number generation point (P1). During coding of the automaton, an attribute "data transmission" of a state obtained after an event corresponding to the collection point P1 is input into the automaton is set to 1. For example, it is assumed that an event corresponding to feature information collected by the CoreSight 270 that is triggered at P1 is $E_{P_1}$, a state that is of the automaton and that exists before $E_{P_1}$ is input is S0, and the state of the automaton is switched to S1 after $E_{P_1}$ is input, that is, (S0)-$E_{P_1}$→(S1). In this case, a value of an attribute "data transmission" corresponding to S1 is set to 1.

It should be noted that in this embodiment, the random number needs to be generated only once, and therefore the random number may also be transferred to the TEE side along with data at another collection point different from P1.

The REE transfers, to the TEE by using a conventional means provided by TrustZone, the hash value H1 obtained by the auto-collection module 210a. Specifically, the hash value is transferred to an audit module 240. The value may be transferred at any time after the hash value is generated, but it is recommended that the value be transferred to the audit module 240 before the audit module 240 is triggered.

Figure 13:
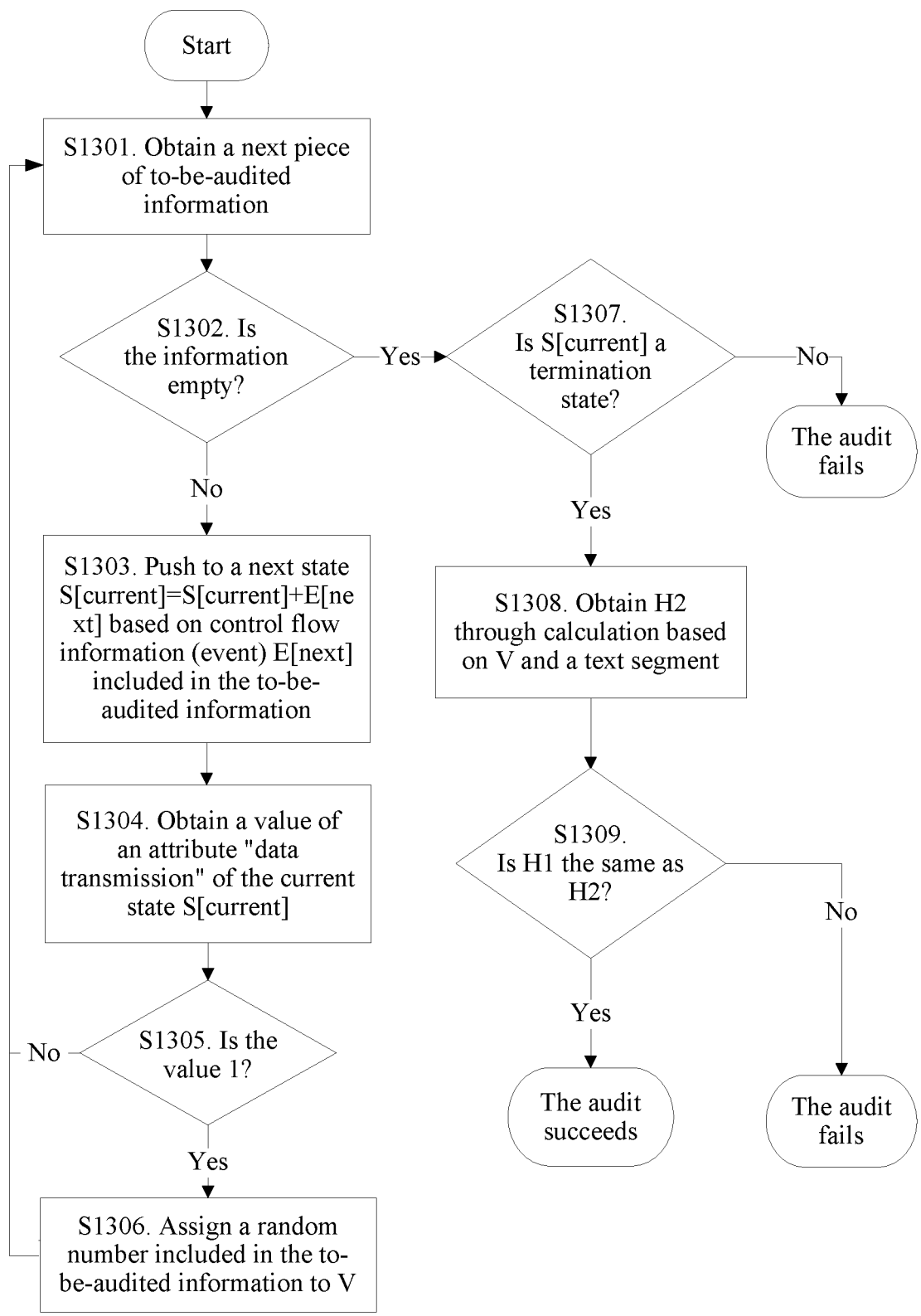
FIG. 13 is a schematic flowchart of an audit method based on FIG. 11 and FIG. 12.

Referring to FIG. 13, after the audit module 240 is triggered, an execution procedure of an automaton instance thereof is similar to that in FIG. 10. A difference is that the random number is generated only once (referring to the random number generation point P1 in FIG. 12). In addition, an attribute "data transmission" of a corresponding state is set. Therefore, the random number is recorded in a variable V after running of the automaton instance ends. For details, refer to steps S1301 to S1306 in FIG. 13.

It should be noted that in other embodiments, steps S1301 to S1306 may be simplified. Because there is only one random number, steps of obtaining and determining the attribute "data transmission" may be cancelled after a value is assigned to the variable V for the first time. Many similar variations are readily figured out by coding persons, and are not described one by one in this application.

Still referring to FIG. 13, if a final state S[current] is a termination state, the value of V and the text segment obtained through hardcoding or the digest that is of the text segment and that is obtained through hardcoding are spliced. A splicing manner is that the value of V is placed before the text segment or the digest of the text segment. A hash operation is performed on data obtained through splicing, to obtain a hash value H2 (S1308). H1 is compared with H2 (S1309). If the two values are the same, the audit succeeds; or otherwise, the audit fails. In other embodiments, if hardcoding is performed on the compressed text segment, decompression is required herein.

The random number generator mentioned in any of the foregoing embodiments is implemented by using hardware. In other embodiments, the random number generator may be alternatively implemented by using software. For example, the two random number generators 280a and 280b in FIG. 8 are replaced with two random number generators that are implemented by using software, and the two software random number generators are respectively placed in a storage area accessible to the REE and a storage area accessible only to the TEE.

According to the method provided in this embodiment, an identity and a control flow can be jointly audited, thereby further improving system security. Further, in a procedure of transmitting identity information from the REE to the TEE, a random number is used to perform scrambling, thereby ensuring security of the procedure of transmitting the identity information.

Embodiment 7

In the embodiment shown in FIG. 4, for the purpose of ensuring security of the CoreSight 270, the CoreSight 270 is reviewed to ensure that the CoreSight 270 is not tampered with. This embodiment further provides a method for implementing security of a tracer. After a secure tracer is implemented in a hardware or software manner, reviewing the tracer is optional.

1. Hardware manner: Security of the CoreSight 270 is ensured through hardware isolation.

Figure 14:
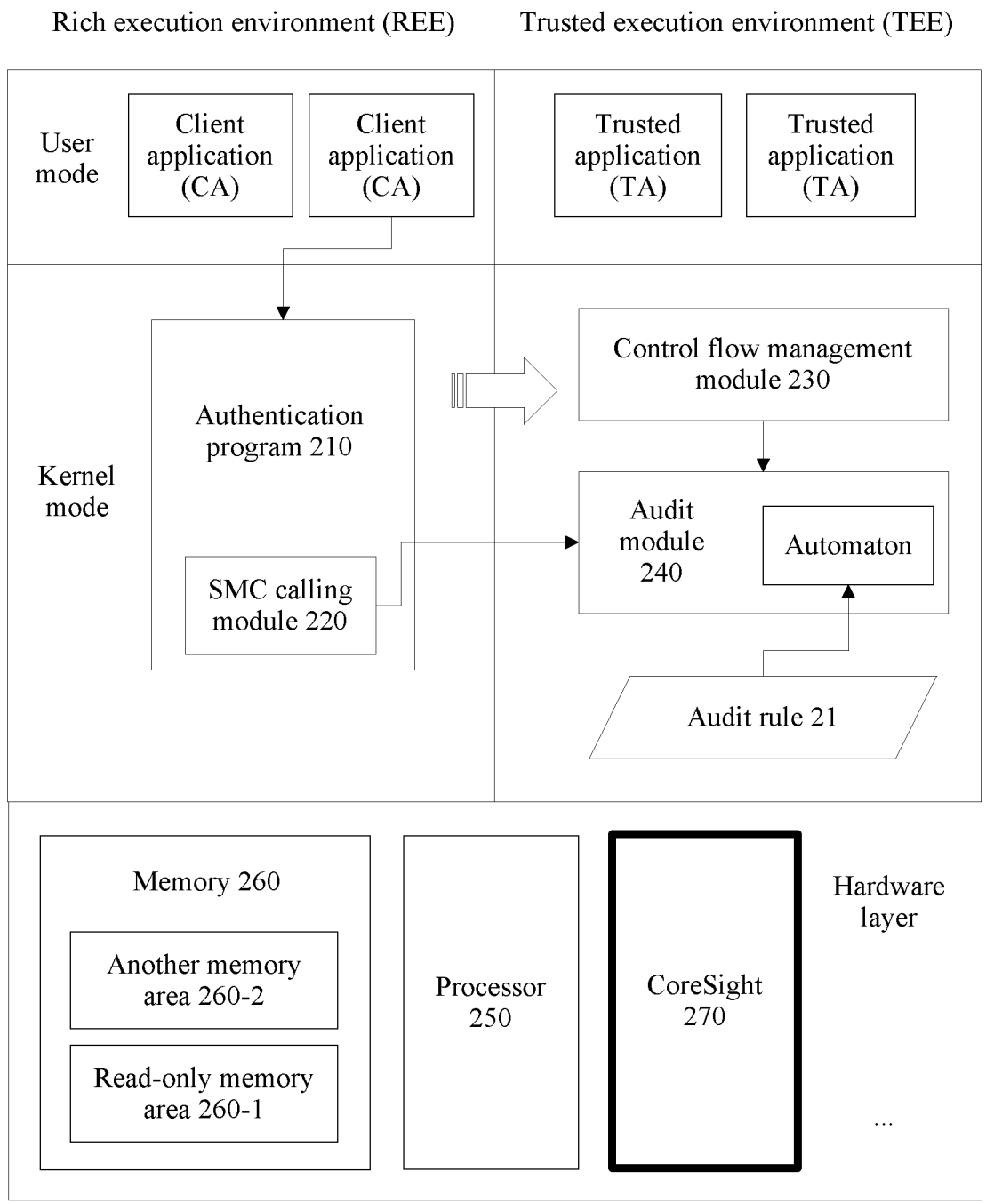
FIG. 14 is a schematic structural diagram of a terminal device according to an embodiment.

At a start stage of a system, the CoreSight 270 is divided to a high-security area of the system in the hardware manner. For example, as shown in FIG. 14, in this embodiment, a TZPC (TrustZone protection controller) may be used to divide modules of the CoreSight 270 to a secure world, namely, a TEE side, to ensure that only the TEE can access the CoreSight 270, thereby preventing the CoreSight 270 from being attacked.

The TZPC is a standard module (IP) in an ARM® architecture, and is capable of dividing different hardware modules in the system to the secure world (for example, the TEE) or an insecure world (for example, a REE). The TZPC has a function of controlling access permission of other hardware. Some hardware may be classified as secure hardware or insecure hardware by using the TZPC. The secure hardware can be accessed only by an operating system in the secure world. If an operating system in the insecure world accesses a hardware register that is classified as secure hardware, an error is caused.

Specifically, the hardware CoreSight 270 is connected to the hardware TZPC during hardware manufacturing, so that the TZPC is capable of controlling the CoreSight 270. Upon a system start, the TEE side is first initialized. In an initialization procedure, division is performed by using the hardware TZPC, so that the CoreSight 270 is accessible in a secure mode and is not accessible in an insecure mode.

2. Software manner: Security of the CoreSight 270 is ensured by setting software access permission. The CoreSight 270 is managed at a higher privilege level of a same security level. When the CoreSight 270 is accessed at a low privilege level, the access is trapped at a high privilege level, and accessing the CoreSight 270 is restricted by using a page table pre-made at the high privilege level.

Specifically, at a start stage of a system, a page table at an EL2 on the REE side is configured to prevent the CoreSight 270 from being accessed at an EL0 and an EL1, and a list of readable/writable registers of the CoreSight 270 and a table of possible values are separately pre-made at the EL2. At an execution and information collection stage of the authentication program 210, accessing the CoreSight 270 by a REE-side Linux® kernel is trapped at the EL2, and the EL2 allows an operation, from the EL1, only on a specific value of a preconfigured register. In this manner, attacks from the EL1 and the EL0 on the CoreSight 270 are avoided to some extent. In this embodiment, although the CoreSight 270 is protected on the REE side, it is still necessary to review the CoreSight 270 in the TEE, to further ensure security.

It should be noted that an EL is an abbreviation for an exception level, and is a concept in ARM®. In a manner, the EL0 may be construed as a user mode, the EL1 is construed as a kernel mode, the EL2 is a hypervisor, and an EL3 is a secure mode. The EL2 can control access to physical memory from the EL0 and the EL1. In the foregoing embodiment, it means that a page table is configured at the EL2, so that accessing a physical memory address of the register of the CoreSight 270 from the EL0 and the EL1 is restricted.

Figure 15:
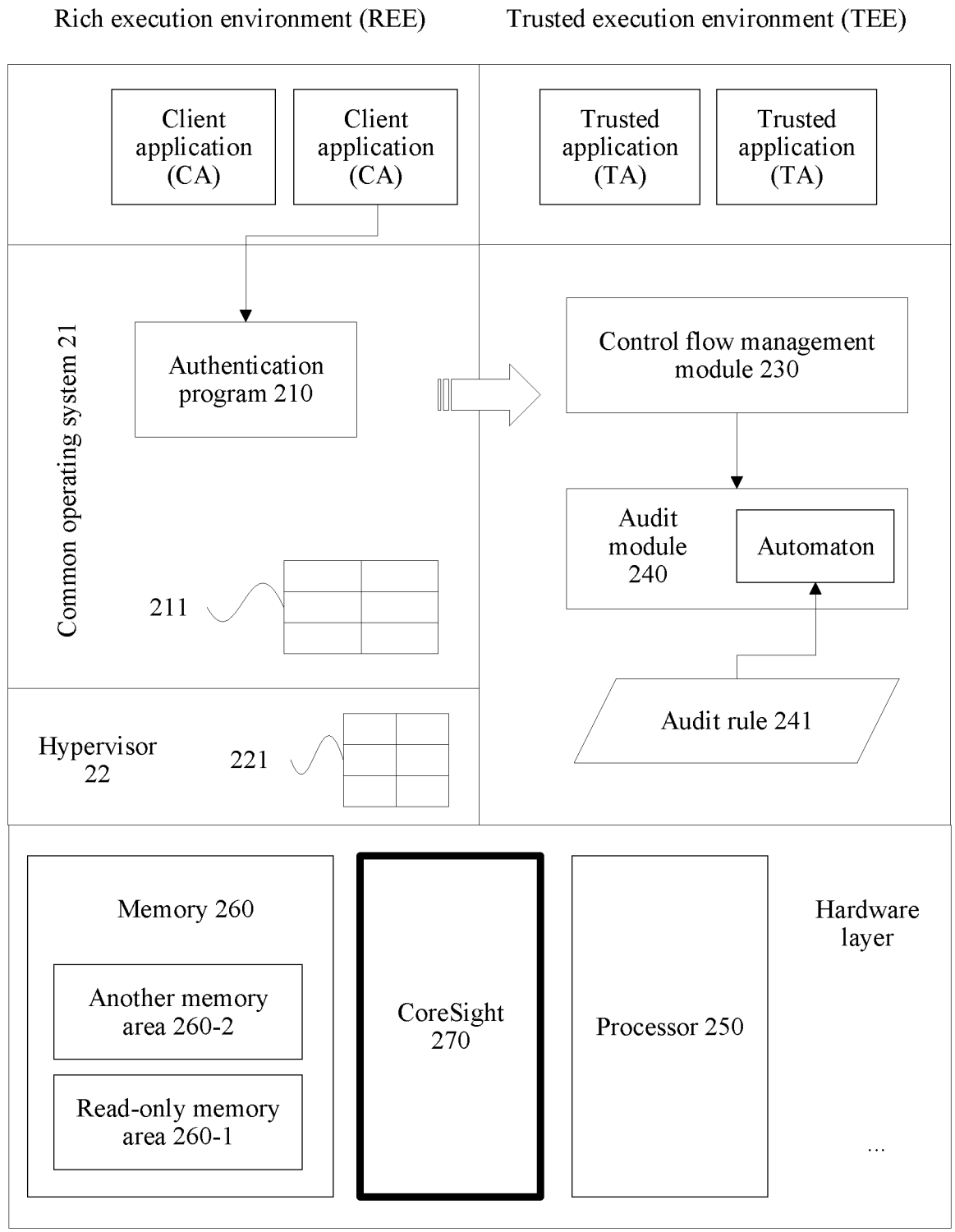
FIG. 15 is a schematic structural diagram of a terminal device according to an embodiment.

FIG. 15 shows another system. In the system, a REE side is divided into a hypervisor (hypervisor) 22 and a common operating system 21 (or referred to as a guest operating system). In this system, the common operating system 21 is the first operating system in the foregoing embodiment (referring to FIG. 1), and when the common operating system accesses a memory (for example, memory and a register) at a hardware layer, two stages of mapping are required. At a first stage, the common operating system 21 maps a virtual address to a virtual linear address by using a managed first page table. At a second stage, the hypervisor maps the virtual linear address to an actual physical address by using a second page table managed by the hypervisor. In this system, if the second page table managed by the hypervisor does not include mapping of some registers, the common operating system 21 cannot access hardware controlled by these registers, but the hypervisor can directly access these registers by using physical addresses. A virtual machine (virtual machine, VM) and a virtual machine monitor (virtual machine monitor, VMM) are specific implementations of the system. The common operating system 21 runs on the VM, and the VMM is the hypervisor.

According to the foregoing mechanism, security of the CoreSight 270 is enhanced by using the hypervisor. Specific implementation steps are as follows: The system is started;

the hypervisor 22 is started; the hypervisor 22 establishes the second page table 221, where the second page table does not include address mapping of the hardware register of the CoreSight 270, in other words, any virtual linear address cannot be mapped to an address of the register of the CoreSight 270; and then the hypervisor 22 starts the common operating system 21, and establishes the first page table 211.

Similarly, after the authentication program 210 is called, the CoreSight 270 is triggered to collect information. During triggering, the CoreSight 270 is not directly triggered. Instead, the common operating system 21 calls a hypercall, and starts the CoreSight 270 by using the hypervisor 22. When the common operating system 21 proceeds to code other than to-be-protected code, the hypercall is called to disable the CoreSight 270 by using the hypervisor 22.

According to the foregoing method, calling of the CoreSight 270 is moved down to the hypervisor 22, to prevent the common operating system 21 from randomly operating the CoreSight 270, thereby improving security of the CoreSight 270.

One tracer includes a plurality of components, for example, a data collection module, a data transmission module, and a data storage module. Therefore, when security of the tracer is implemented in the software or hardware manner, only one or more key components thereof may be protected. For example, only the data storage module configured to store data may be protected in the hardware or software implementation. In this manner, the operating system or the common operating system 22 on the REE side can still control the data collection module and the data transmission module of the CoreSight 270, but cannot control the data storage module. This not only improves flexibility, but also prevents the operating system or the common operating system 22 on the REE side from writing forged data into the data storage module for spoofing.

3. Combination of software and hardware: Considering that one tracer includes a plurality of components, for convenience of system software design and to reduce software overheads, some components (for example, an ETM) may be protected in the foregoing software manner, and remaining components are protected in the hardware manner. The ETM (Embedded Trace Macrocell) is a component of the CoreSight, and is configured to obtain trace information of a processor core.

In any one of the foregoing manners, the tracer can be prevented from being tampered with to some extent, to ensure security of the tracer. This avoids tracer review without affecting system security, and simplifies a control flow audit procedure.

Embodiment 8

To further prevent a malicious program from forging a control flow by using incorrect data to spoof control flow audit procedure, in this embodiment, a to-be-audited element is added, and a method for jointly auditing a control flow and a data flow is provided.

Figure 16:
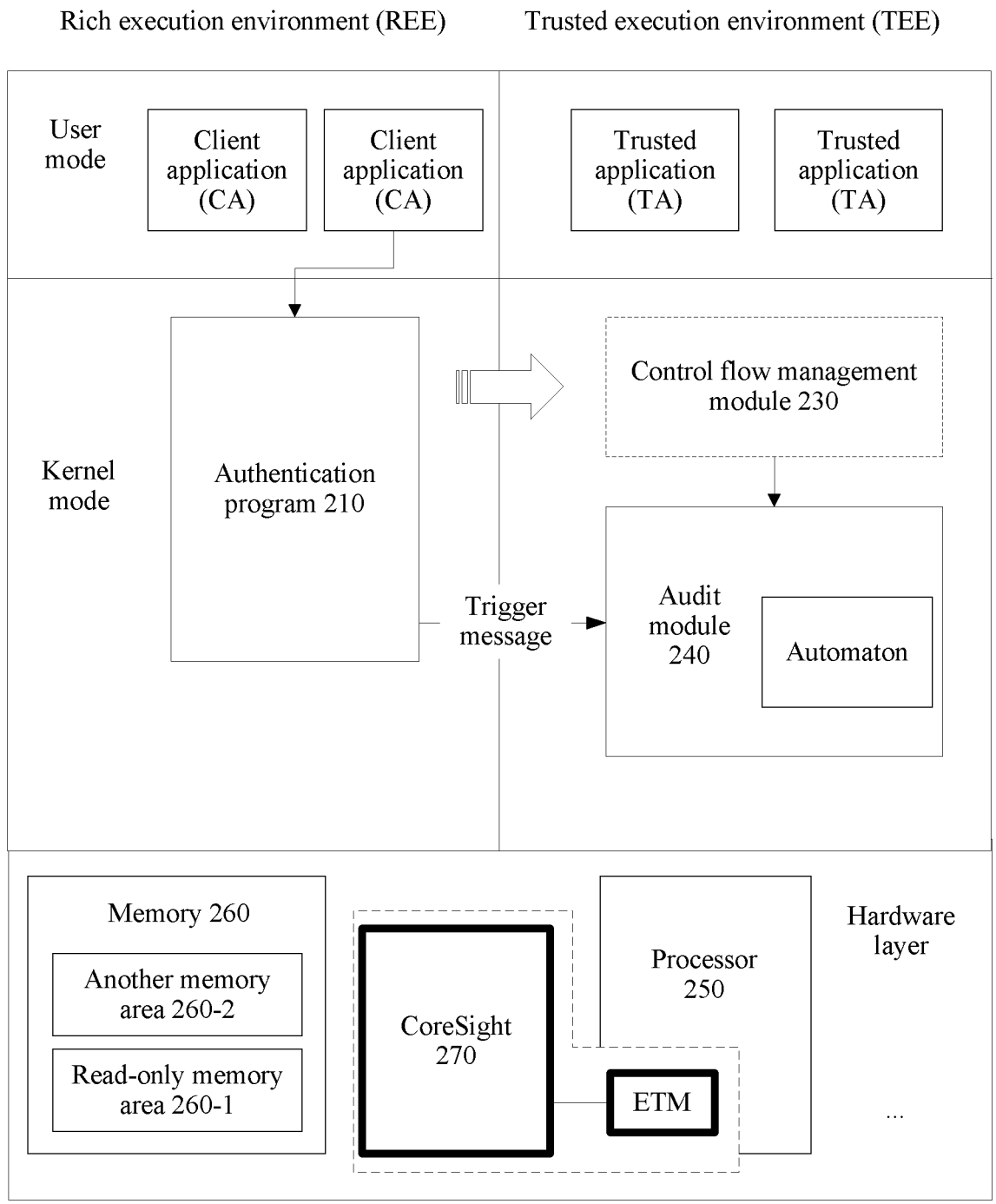
FIG. 16 is a schematic structural diagram of a terminal device according to an embodiment.

FIG. 16 is a schematic structural diagram of a terminal device according to an embodiment. The terminal device includes a CoreSight 270, and a ViewData function of an ETM component of the hardware is enabled. The ETM is a component of the CoreSight 270, is located inside a processor 250, and is configured to collect control flow information. The ViewData function is an optional function of the hardware ETM. If the function is configured, the ETM is capable of monitoring a value of data that is read from or written into memory by using a load/store instruction. After the ViewData function is enabled, if the load/store instruction is monitored, in addition to the control flow information, collected information further includes the value of the data that is read or written by using the load/store instruction. This part of information is referred to as a data flow or data flow information in this embodiment.

An authentication program 210 in this embodiment is no longer a prior-art authentication program. A plurality of CoreSight trigger instructions are inserted at a plurality of locations in the authentication program 210. There are load/store instructions at some or all of the locations at which the CoreSight trigger instructions are inserted. The trigger instruction is used to trigger the CoreSight 270 to collect the control flow information and the data information. The CoreSight trigger instruction may be a segment of program. The program has the following functions: 1. configuring a data transfer register of the CoreSight 270; and 2. enabling the CoreSight 270 to start to collect data. The function 1 includes configuring a register of the ETM component of the CoreSight 270, to enable the ViewData function of monitoring a data flow. After receiving trigger information, an audit module 240 obtains the control flow information and the data flow information of the authentication program 210 from a memory 260, or calls a control flow management module 230 to obtain the control flow information and the data flow information.

In the foregoing embodiment, it is mentioned that a state of an automaton has two attributes: "initialization" and "termination". In this embodiment, during design of the automaton, an attribute "data flow audit" is added to each state, or the two attributes are added to one or more states thereof as required. A state with the attribute "data flow audit" further requires a data constraint condition. The data constraint condition may be a restriction on a range of a data value. For example, the data is not 0 or is greater than 1000. Alternatively, the data constraint condition may be a relationship between the data and other data. For example, the data is twice data obtained in a state x or is less than data obtained in a state y. If the data constraint condition is the relationship between the data and the other data, a group of variables needs to be added to the automaton, to store data obtained in a running procedure of the automaton. The data is referred to as an "obtained-data list".

In addition, in this embodiment, a state is added during design of the automaton. The newly added state is not an initialization state or a termination state, and a target state without any other state is the state. All events can be accepted in this state, and all target states are the state. The state is referred to as a state F below.

After the audit module 240 is triggered, an automaton instance is generated, and the automaton instance is driven, based on the obtained control flow information and data flow information, to perform state switching to audit a control flow and a data flow. In this embodiment, a state switching rule has the following changes: after to-be-audited information is received and a state is pushed forward, determining, based on an attribute "data flow audit" of a current state, whether to obtain a value of data that is related to the data flow and that is in the to-be-audited information (where the to-be-audited information may alternatively not include the data related to the data flow); checking the value of the data based on a data constraint condition corresponding to the state; and if the check succeeds, storing the data in the "obtained-data list" of the automaton, and continuing to obtain a next piece of to-be-audited information; or if the check fails, setting the current state to the state F.

Figure 17A:
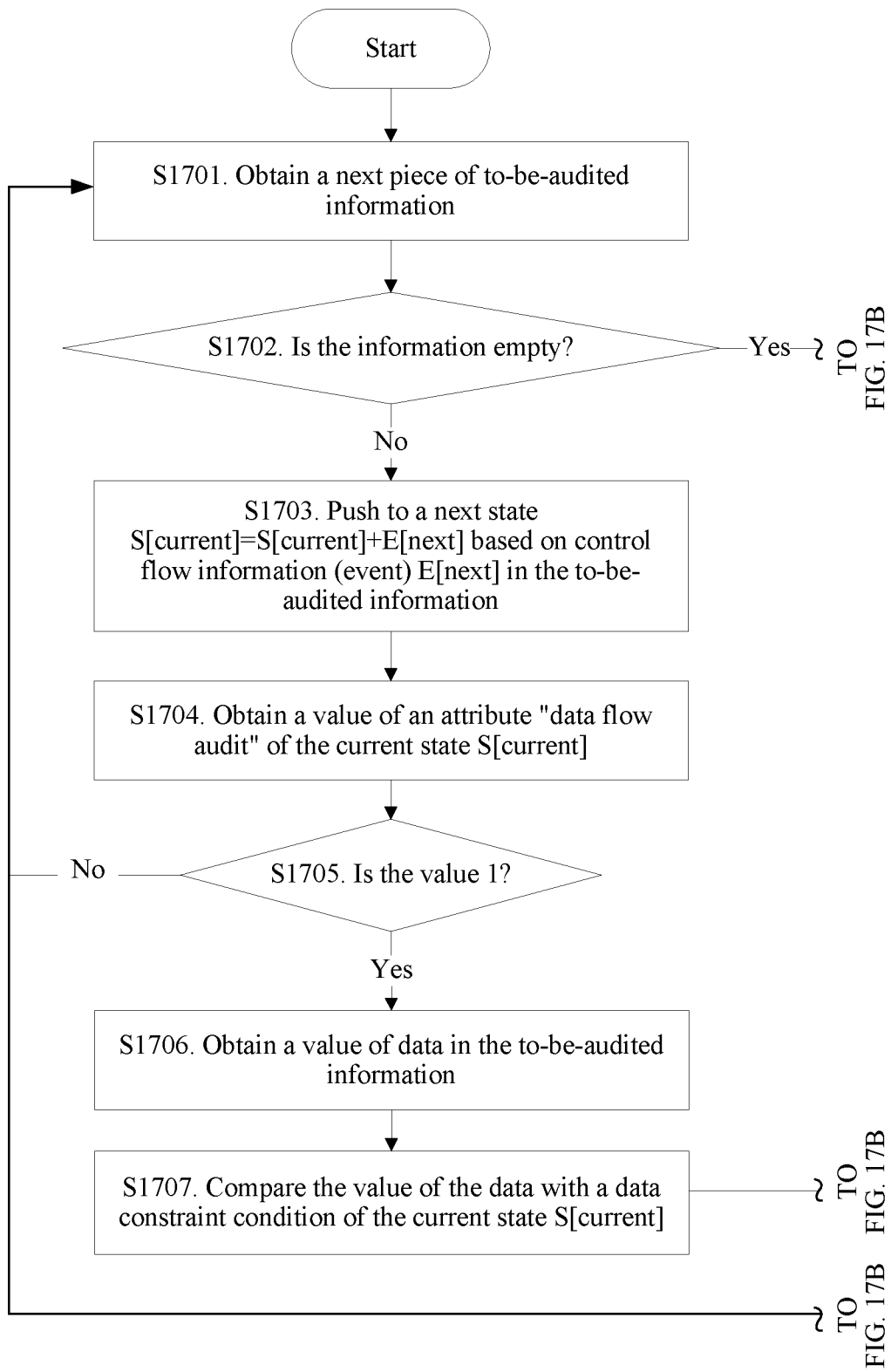
FIG. 17A and FIG. 17B are a schematic flowchart of an audit method based on FIG. 16.
Figure 17B:
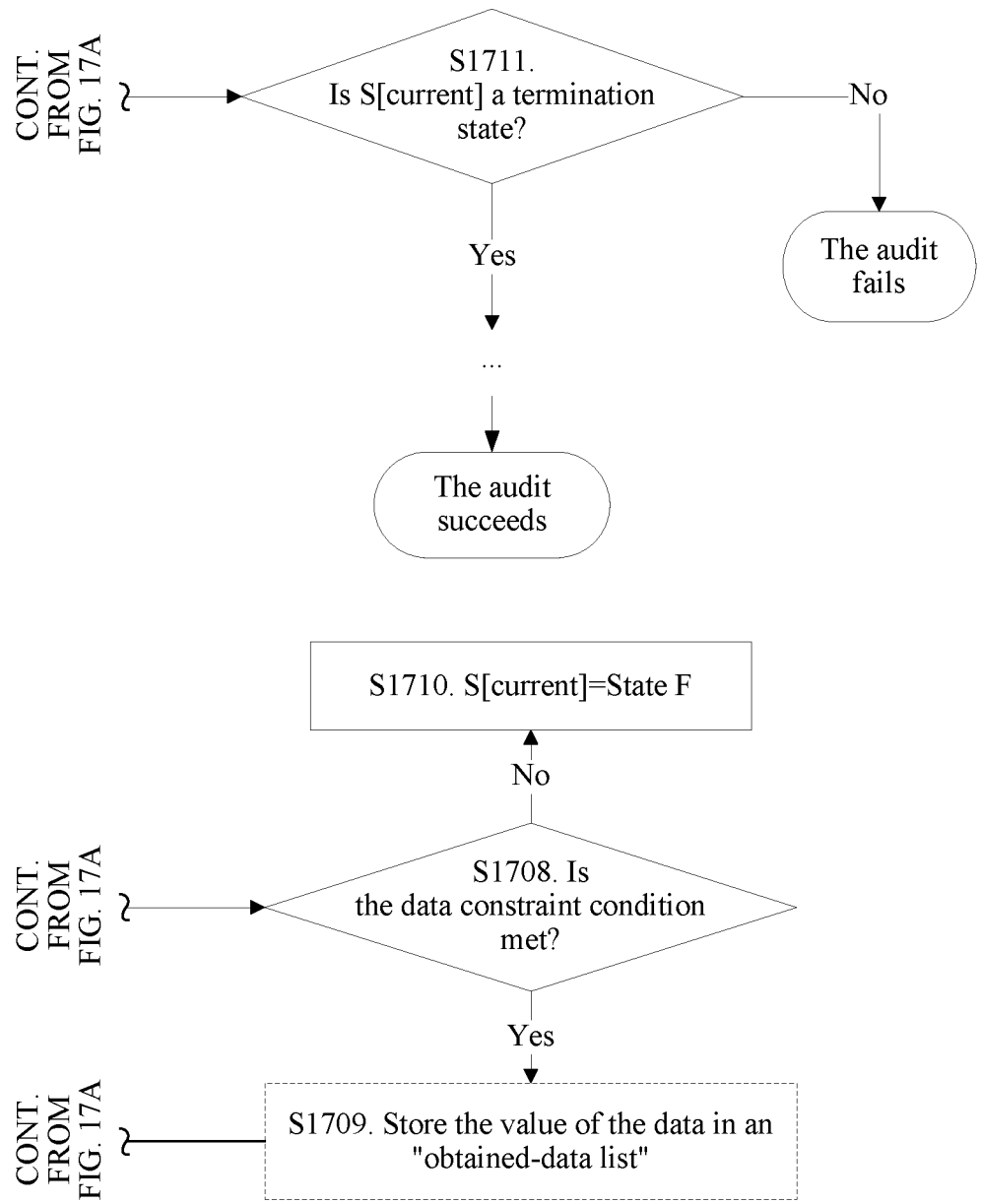

Specifically, referring to FIG. 17A and FIG. 17B, the audit module 240 obtains an attribute value of the attribute "data flow audit" of the current state S[current] (S1704). If the value is not 1, the audit module 240 goes back to step S1701. If the value is 1, the audit module 240 compares the value of the data with the data constraint condition of S[current] (S1707). If the value of the data meets the data constraint condition, the audit module 240 stores the value of the data in the "obtained-data list" (S1709), and goes back to step S1701; or otherwise, sets S[current] to the state F. After all to-be-audited information is processed, if S [current] is not a termination state, the audit fails. If S[current] has been set to the state F once in previous processing, the state F is kept until the end according to a characteristic of the state F, and consequently the audit fails. If S[current] is a termination state, the audit succeeds, or other determining is performed with reference to any of the foregoing embodiments.

In other embodiments, if it is known that each data constraint condition does not need to be compared with other data or historical data, the data in the data flow may not be recorded, that is, the variable "obtained-data list" is not set.

It should be noted that the setting of the attribute "data flow audit" herein is only an example, and other manners are not listed one by one. FIG. 17A and FIG. 17B are only a diagram of important steps in this embodiment. For some steps similar to those in the foregoing embodiments, refer to the foregoing descriptions.

The method in this embodiment may be combined with the method in other embodiments of this application for use. For example, the attribute "data flow audit" coexists with one or more of the attribute "data transmission" and the attribute "a quantity of random number generator access times" that are mentioned in the foregoing embodiment. In this case, when one piece of to-be-audited information is processed, coexisting attributes are processed in the manner described in the foregoing embodiment.

Embodiment 9

A method provided in this application may be applied not only to a relatively complex scenario, but also to a simple scenario. For the simple scenario, this embodiment provides a simplified audit method.

In this embodiment, there is only one CPU, and an external interrupt is disabled in an execution procedure (referred to as an authentication procedure below) of an authentication program 210. In this embodiment, addresses (which are respectively referred to as an address A and an address B) of an authentication procedure start instruction and a TEE function calling instruction in the authentication program 210 are placed in an operating system on a TEE side through hardcoding.

In this embodiment, no CoreSight trigger instruction is inserted into the authentication program 210. A CoreSight 270 is controlled by the operating system on the TEE side, and is started before each time of switching to a REE (including the first time of switching to the REE during start). After the CoreSight 270 is started, the CoreSight 270 starts to collect control flow information and stores the control flow information in a memory inside the CoreSight 270. When or after switching to the TEE is performed, the operating system on the TEE side reads the control flow information stored in the memory inside the CoreSight 270, and based on the address A and the address B (obtained through hardcoding) stored on the TEE side, finds a collection point y (or construed as a data point) at which the address B appears for the last time and a collection point x at which the address A appears for the last time before the address B appears for the last time. It is checked whether another collection point exists between the collection point y and the last collection point recorded in hardware. Address information of the another point is the address A. Audit fails if any one or more of the following cases are met: 1. The collection point y cannot be located. 2. The collection point x cannot be located. 3. The address A exists between the collection point y and the last collection point recorded in the hardware.

It should be noted that in other implementations, Core-Sight trigger instructions can be still inserted at code locations corresponding to the address A and the address B to collect the control flow information. In addition, the foregoing steps may be simply extended to verify whether the REE executes three or more addresses in sequence.

According to the simplified audit method, it can be learned that an audit rule is not necessarily implemented by using an automaton, and a control flow or other information is not necessarily audited by using an automaton instance. Different rules may be set for different scenarios. Different implementations are used based on a feature and complexity of a rule. A simple matching procedure may be executed according to a simple rule to still achieve an audit effect.

Embodiment 10

In some of the foregoing embodiments, a tracer trigger instruction is inserted in an original program, to form a to-be-protected program. The to-be-protected program may be manually compiled, in other words, the trigger instruction is manually inserted; or the to-be-protected program may be automatically generated by a computer according to an audit requirement. This embodiment provides a method for automatically generating a to-be-protected program.

Figure 18:
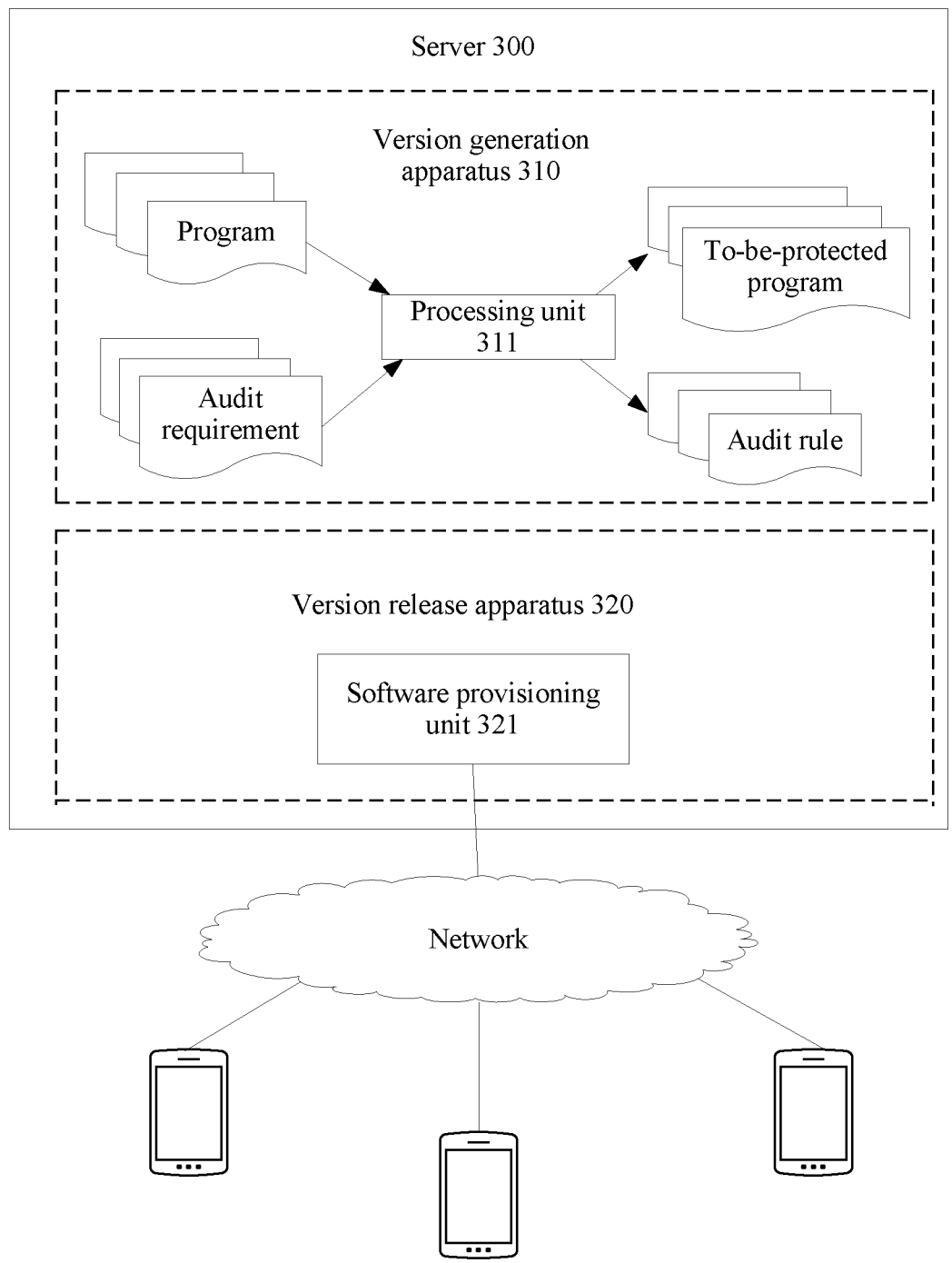
FIG. 18 is a schematic diagram of a server and a network in which the server is located according to an embodiment.

Referring to FIG. 18, a side of a server 300 includes a version generation apparatus 310 and a version release apparatus 320. The two apparatuses may exist on a same physical server or different physical servers.

The version generation apparatus 310 includes a processing unit 311. The processing unit 311 is configured to: automatically generate a to-be-protected program and an audit rule according to a program and an audit requirement, and send the generated to-be-protected program, or the to-be-protected program and the audit rule to a terminal device such as a smartphone or a laptop computer by using a software provisioning unit 321 in the version release apparatus. The terminal device stores the to-be-protected program and the audit rule in a local memory, and may store the to-be-protected program and the audit rule in a read-only storage area, to prevent the to-be-protected program and the audit rule from being maliciously tampered with.

Embodiment 11

When there are a large quantity of paths in a to-be-audited control flow and description of an audit rule is complex, audit efficiency may be reduced, and a normal service is affected. In addition, a complex rule further lowers audit accuracy, and consequently audit becomes invalid. For a more complex scenario, this embodiment provides a machine learning manner to improve accuracy of the description of the audit rule and to reduce complexity of the rule as much as possible, so as to improve audit efficiency.

In this embodiment, collection is mainly performed to generate a positive sample, and an attack is simulated to generate a negative sample, to learn and generate a control flow model from the two samples and generate the audit rule based on the control flow model. In this embodiment, the audit rule is a model obtained through machine learning, collected information may be directly input into the model or input into the model after screening, and whether audit succeeds is determined based on a calculation result (where an automaton is optional).

In addition, no trigger instruction needs to be inserted to trigger a tracer to perform collection. Provided that the tracer is set to a started state, the tracer may collect all control flow information of a running program, and extract the audit rule through machine learning by using the collected control flow information. Further, if the method such as the data flow audit method described in some of the foregoing embodiments needs to be used, both data flow information and other to-be-audited information may be collected.

Figure 19:
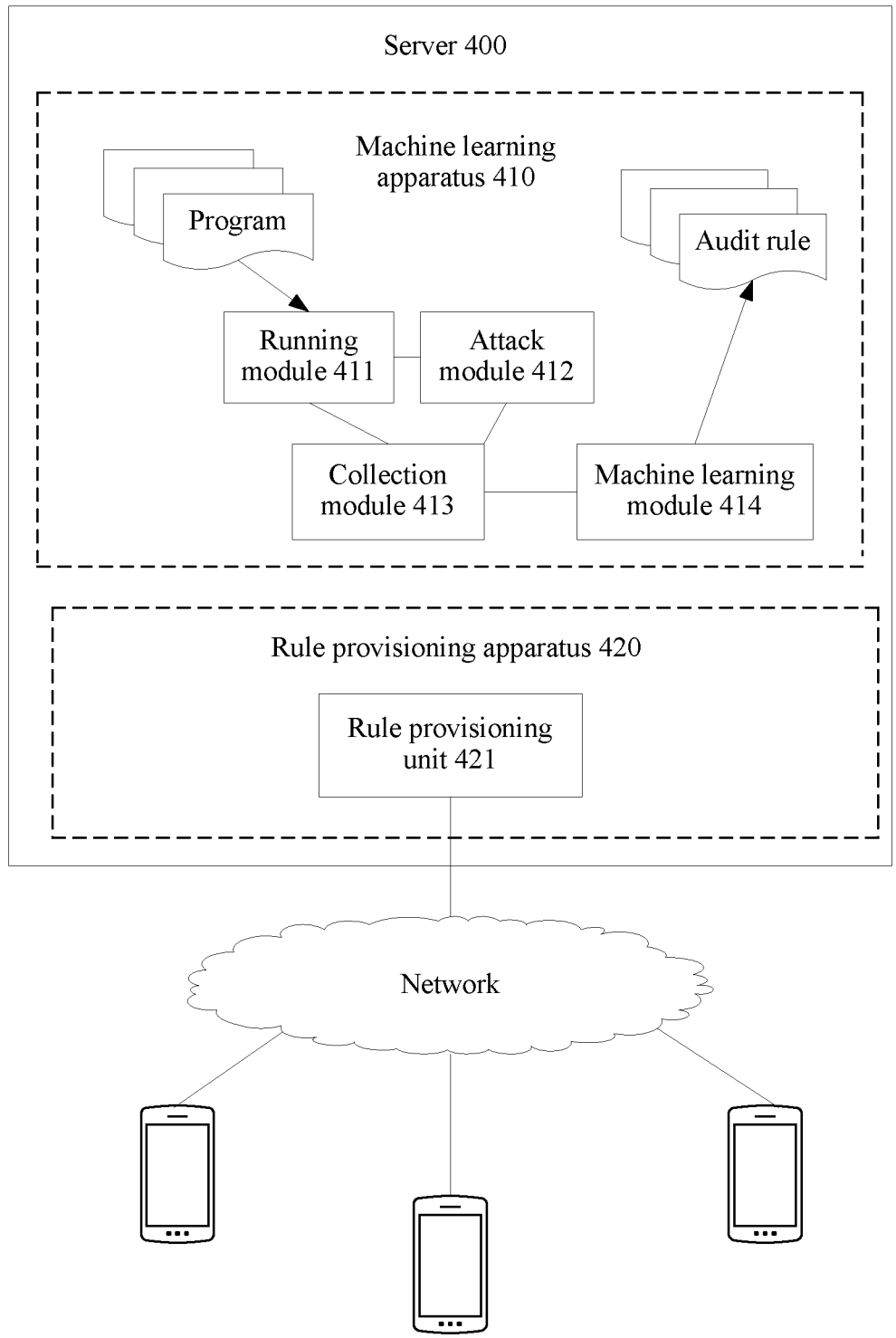
FIG. 19 is a schematic diagram of a server and a network in which the server is located according to an embodiment.

As shown in FIG. 19, the server 400 includes a machine learning apparatus 410 and a rule provisioning apparatus 420. The machine learning apparatus 410 is configured to generate an audit rule by using a machine learning method. A rule provisioning unit 421 in the rule provisioning apparatus 420 is configured to send the audit rule to each terminal device. The apparatus 420 in FIG. 19 and the apparatus 320 in FIG. 18 may be integrated into one apparatus.

The audit rule is generated by using the following method:

1. A program is compiled into a runnable target program, and a running module 411 runs the target program on a target terminal or in a simulated environment. 2. In a running procedure of the target program, the running module 411 simulates various input conditions, and a collection module 413 collects control flow information and/or data flow information in these conditions, to use the information as a positive sample. 3. In the running procedure of the target program, an attack module 412 simulates various possible attacks, and the collection module 413 collects control flow information and/or data flow information in an attack procedure, to use the information as a negative sample. 4. The positive sample and the negative sample are used as a feature model of the program and input into a machine learning algorithm, and a rule of a program execution feature is extracted by using the algorithm. 5. A processing tool is enabled to process the rule and a to-be-audited source. 7. An audit blueprint that is output through processing and a protected object are placed on a version release server as a version release target. In this embodiment, the collection module 413 collects information by using the tracer.

The following describes the positive sample, the negative sample, and a detailed learning training procedure. It should be understood that collection procedures of the positive sample and the negative sample are similar to the information collection procedure in the audit method described in the foregoing embodiment. For similar or same parts, refer to the foregoing embodiment.

1. Obtain a positive sample.

(1) An audit point is reached, and to-be-audited information is submitted. The to-be-audited information may include control flow information and data flow information.

(2) A secure-domain (for example, a TEE) operating system reads the to-be-audited information in a cyclic buffer, and records the to-be-audited information in a (non-volatile) memory. The record is referred to as a positive sample.

(3) The secure-domain operating system returns information indicating that the audit succeeds, and a subsequent operation is performed.

(4) The foregoing procedure is executed in different scenarios to obtain a specific quantity of positive samples.

The cyclic buffer may be implemented as an array, and information is recorded from the beginning. If the array is full, recording continues from the beginning, to overwrite an earliest record in the buffer.

1. Obtain a negative sample.

(1) An attack is launched against the system, to attempt to bypass the program and call an audit point. A ROP attack is used as an example.

a. A system image is analyzed, an available gadget is found by using a ROP gadget or a similar tool, and an attack chain is constructed. The attack chain implements the following function: calling a function (for example, a TA) in a secure operating system.

b. A gadget calling chain is placed on a stack by using a stack overflow vulnerability that is set on purpose or that currently exists in the system.

c. When the system proceeds to a ret instruction, the ROP attack starts: A specific function in the program is executed through ROP, and the secure-domain operating system is called.

(2) If the secure-domain operating system is called, the audit point is reached. To-be-audited information is read from a cyclic buffer, and is recorded in a memory. The record is referred to as a negative sample.

A full name of ROP is return-oriented programming (return-oriented programming), which is a novel attack based on a code reuse technology. An attacker extracts an instruction gadget from an existing library or an executable file to construct malicious code.

3. Establish a model.

A classifier is established by using a machine learning algorithm based on the positive sample and the negative sample. A C5.0 decision tree algorithm is used as an example.

(1) Data preprocessing 1: All positive samples and all negative samples are parsed, and an event set is generated for each sample. The event is an event that appears in the sample. For example, a CPU3 executes an instruction at a location 0xffffff12340000.

(2) Data preprocessing 2: Unimportant information in the event set is eliminated, such as a CPU number.

(3) All data points appearing in the positive samples and the negative samples are analyzed, and high-dimensional space is established. Each data point that has appeared in a sample is a dimension. For example, if the following information appears in a sample: the instruction at the location 0xffffff12340000 is executed, there is a dimension corresponding to the event in the high-dimensional space.

(4) Vectorization: Each sample is converted into a vector in the high-dimensional space defined in the foregoing step. A conversion principle is as follows: If there is an event in an event set of the sample, a value of the vector in a dimension corresponding to the event is 1; or otherwise, the value is 0.

(5) Tagging: All vectorized samples are converted into 2-tuples: <vector, positive/negative>. A value of "positive/negative" in the positive sample is true, and the value is false in the negative sample.

(6) For all tagged vectors generated in the foregoing step, a decision tree is generated by using the C5.0 algorithm. An effect of the decision tree is that a vector is given and true or false is given. A training purpose is to return true for a vector in the positive sample as much as possible and return false for a vector in the negative sample as much as possible.

(7) The decision tree generated in the foregoing step is coded to obtain an audit rule.

The following uses a program of calculating A+B/C as an example. The program is translated into the following assembly language:

1: X1=[B]
2: X2=[C]
3: X3=X1/X2
4: X4=[A]
5: X5=X4+X3

Herein, data is generated by using each of the instructions 1, 2, and 4. During training, various valid A, B, and C are used as inputs to run the program and generate a plurality of positive samples. Control flows of these positive samples are all 1-2-3-4-5, and data flows are different, but a value of C is never 0.

(1) First, this segment of program is attacked. Various attack methods are used, for example, preemption is performed through ROP, to execute only a subsequent part, an interrupt is sent to a CPU to interrupt execution and the like, and invalid data is used, for example, C is set to 0. Finally, a plurality of negative samples are generated. (2) Next, a feature is extracted. In this step, the feature needs to be obtained by using some mathematic methods or through manual designation. In this example, a control flow feature and a data flow feature are extracted, where the control flow feature is that the instruction 1 is followed by the instruction 2, the instruction 2 is followed by the instruction 3, the instruction 3 is followed by the instruction 4, the instruction 4 is followed by the instruction 5 (all these are valid features), the instruction 2 is followed by the instruction 1, and the instruction 5 is followed by the instruction 2 . . . (these are invalid features); and the data flow feature is that A is not 0, B is not 0, C is not 0 . . . . (3) Then vectorization is performed. Each piece of data is converted into a vector. Each dimension of the vector is corresponding to one of the foregoing features. If the data meets the feature, a value in the dimension is 1; or otherwise, the value is 0. For example, a feature of a positive sample may be [1, 1, 1, 1, 0, 0, . . . , 0, 0, 1], and a feature of a negative sample may be [0, 1, 0, 1, 0, 0, . . . , 0, 1, 1].

If conversion is performed on each sample, a plurality of vectors are generated, and it is known that the vector is corresponding to a positive sample or a negative sample.

After the foregoing information is obtained, training can be performed by using the C5.0 decision tree training algorithm. Finally, a decision tree is obtained, and the decision tree is the audit rule.

In the procedure in which the terminal device performs audit, the collected information is vectorized and then input into the decision tree, and the sample is output as a positive sample or a negative sample. If a conclusion is a negative sample, the audit fails.

The audit rule may be automatically generated through machine learning, and is sent to the terminal device. The audit rule may be one or more models (which may be construed as formulas). Then the terminal device collects the to-be-audited information in real time, and inputs the to-be-audited information into the model, to obtain an audit result. It can be learned that, according to the method, a generation speed and accuracy of the audit rule can be improved, and reliability of the audit procedure is further improved.

In the procedure of generating the audit rule, if to-be-audited information such as all control flows is used, in a procedure in which the terminal device audits the control flows, no CoreSight trigger instruction needs to be inserted as described in the foregoing embodiment to trigger the tracer at a specific location in the to-be-protected program to collect the to-be-audited information. Instead, the tracer can be started before execution of the to-be-protected program starts, and a function of the tracer is configured, so that the tracer can collect the to-be-audited information such as the control flows.

In other embodiments, a location at which the trigger instruction needs to be inserted may also be determined by using the machine learning algorithm. For example, after the decision tree is generated, an instruction with a larger weight is selected, and the trigger instruction is inserted at a code location corresponding to the instruction. It can be learned that the machine learning algorithm may also be combined with the method for inserting a trigger instruction.

Embodiment 12

Figure 20:
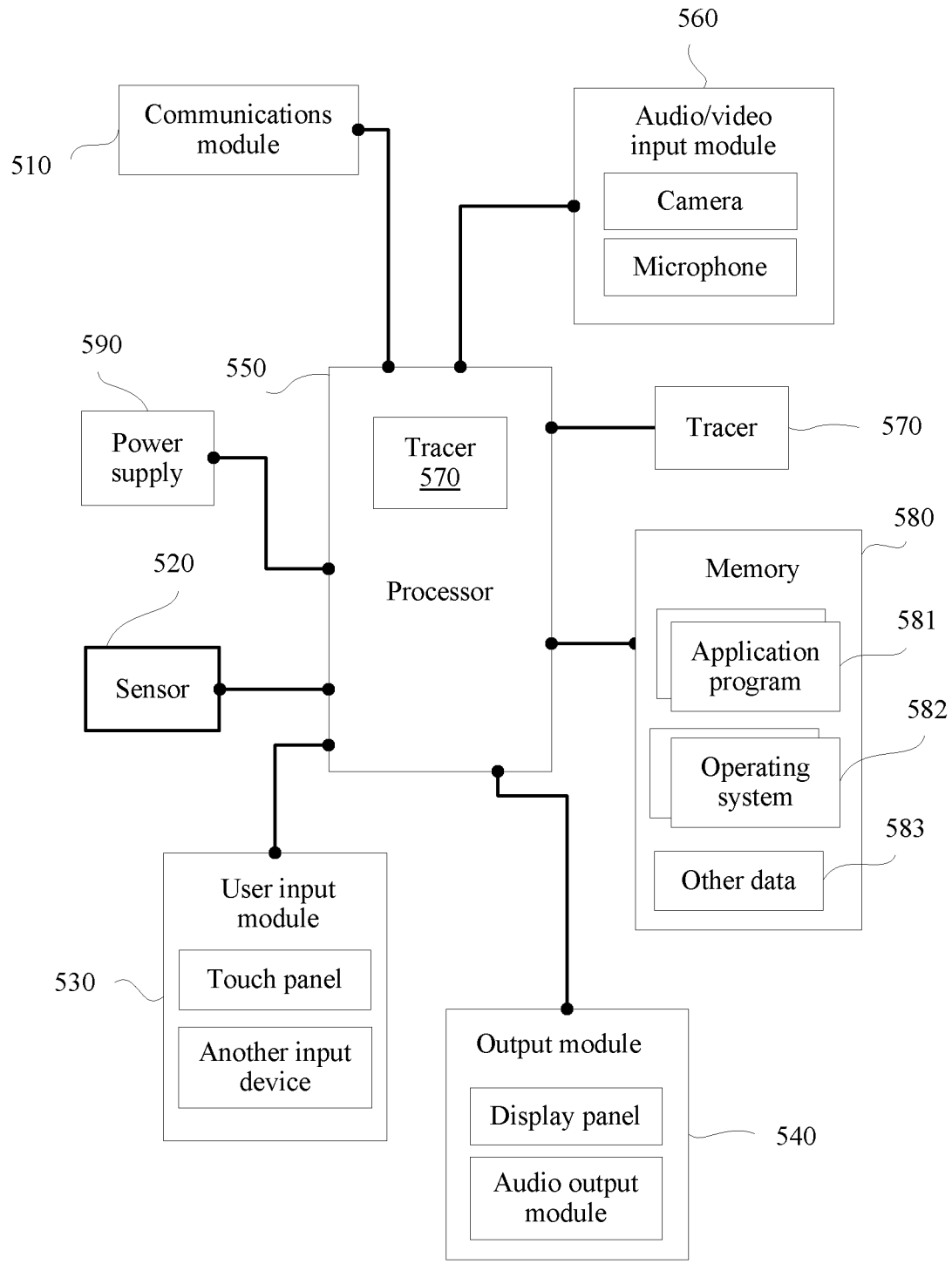
FIG. 20 is a schematic diagram of a logical structure of a terminal device according to an embodiment.

FIG. 20 is a schematic structural diagram of a computer system according to an embodiment. The computer system may be a terminal device. As shown in the figure, the computer system includes a communications module 510, a sensor 520, a user input module 530, an output module 540, a processor 550, an audio/video input module 560, a tracer 570, a memory 580, and a power supply 590.

The communications module 510 may include at least one module that can enable the computer system to communicate with a communications system or another computer system. For example, the communications module 510 may include one or more of a wired network interface, a broadcast receiving module, a mobile communications module, a wireless Internet module, a local area communications module, and a location (or positioning) information module. The plurality of modules each have various implementations in the prior art, and are not described one by one in this application.

The sensor 520 may sense a current state of the system, for example, an open/closed state, a location, whether the system is in contact with a user, a direction, and acceleration/deceleration. In addition, the sensor 520 may generate a sensing signal used to control an operation of the system.

The user input module 530 is configured to: receive input digital information or characteristic information or a contact touch operation/contactless gesture, and receive signal input related to user settings and function control of the system, and the like. The user input module 530 includes a touch panel and/or another input device.

The output module 540 includes a display panel, configured to display information entered by a user, information provided for the user, various menu interfaces of the system, or the like. Optionally, the display panel may be configured in a form of a liquid crystal display (liquid crystal display, LCD), an organic light-emitting diode (organic light-emitting diode, OLED), or the like. In some other embodiments, a touch panel may cover the display panel, to form a touch display screen. In addition, the output module 540 may further include an audio output module, an alarm, a tactile module, and the like.

The audio/video input module 560 is configured to input an audio signal or a video signal. The audio/video input module 560 may include a camera and a microphone.

The power supply 590 may receive external power and internal power under control of the processor 550, and provide power required by operations of various components of the system.

The processor 550 may include one or more processors. For example, the processor 150 may include one or more central processing units, or include one central processing unit and one graphics processing unit. When the processor 150 includes a plurality of processors, the plurality of processors may be integrated into a same chip, or each of the processors may be an independent chip. One processor may include one or more physical cores, and the physical core is a minimum processing module.

The tracer 570 is configured to collect instruction information of the processor for debugging or another purpose. The tracer 570 includes a plurality of components that are distributed at various layers of the system. Some components may be embedded into the processor, as shown in the figure.

The memory 580 stores a computer program. The computer program includes an operating system program 582, an application program 581, and the like. A typical operating system includes a system used in a desktop computer or a notebook computer, such as Windows of Microsoft or MacOS of Apple, and also includes a system used in a mobile terminal, such as a Linux®-based Android (Android®) system developed by Google.

The memory 580 may be one or more of the following types: a flash (flash) memory, a memory of a hard disk type, a memory of a micro multimedia card type, a card-type memory (for example, an SD or XD memory), a random access memory (random access memory, RAM), a static random access memory (static RAM, SRAM), a read-only memory (read-only memory, ROM), an electrically erasable programmable read-only memory (electrically erasable programmable read-only memory, EEPROM), a programmable read-only memory (programmable ROM, PROM), a magnetic memory, a magnetic disk, or an optical disc. In some other embodiments, the memory 580 may be a network storage device in the Internet. The system may perform an operation such as updating or reading on the memory 580 in the Internet.

The processor 550 is configured to: read the computer program from the memory 580, and then perform a method defined by the computer program. For example, the processor 550 reads the operating system program 582, to run an operating system in the system and implement various functions of the operating system, or reads one or more application programs 581, to run an application in the system.

The memory 580 further stores other data 583 in addition to the computer program, for example, to-be-audited information mentioned in this application.

In the solutions provided in this application, another operation different from an operation implemented by the tracer may be implemented by using hardware or software. In the hardware implementation, implementations of this application may be implemented by using at least one of electronic units such as an application-specific integrated circuit (application-specific integrated circuit, ASIC), a digital signal processor (digital signal processor, DSP), a programmable logic device (programmable logic device, PLD), a field programmable gate array (field programmable gate array, FPGA), a processor, a controller, a microcontroller, and/or a microprocessor. In the software implementation, implementations of a procedure and a function may be implemented by using a software module that executes at least one function and operation. The software module may be implemented by using a software program compiled by using any appropriate software language. The software program may be stored in the memory 580, and is read and executed by the processor 550. The tracer used in this application includes a plurality of hardware components that are distributed at a plurality of layers of the system. However, execution of hardware usually requires driving of software, and therefore it is not excluded that some components in the "tracer" may be implemented by using software.

A connection relationship among the modules in FIG. 20 is only an example. A method provided in any embodiment of this application may also be applied to the terminal device in another connection manner. For example, all the modules are connected by using a bus.

It should be noted that the module or unit division provided in the foregoing embodiment is only an example. Functions of the described modules are only examples for description, and this application is not limited thereto. Persons of ordinary skill in the art may combine functions of two or more modules thereof as required, or divide a function of one module to obtain more modules at a finer granularity and other variants.

For same or similar parts between the described embodiments, mutual reference may be made between the embodiments.

The described apparatus embodiments are only examples. The modules described as separate components may or may not be physically separated. Components shown as modules may or may not be physical modules, may be located at one position, or may be distributed on a plurality of network modules. Some or all of the modules may be selected according to actual needs to achieve the objectives of the solutions of the embodiments. In addition, in the accompanying drawings of the apparatus embodiments provided in the present invention, connection relationships between modules indicate that the modules have communication connections to each other, and the connection may be specifically implemented as one or more communications buses or signal cables. Persons of ordinary skill in the art may understand and implement the embodiments of the present invention without creative efforts.

The foregoing descriptions are only some specific implementations of this application, but are not intended to limit the protection scope of this application.

What is claimed is:

1. A computer system including a first domain and a second domain deployed in the computer system, the computer system comprising:
   a tracer;
   a memory storing computer readable instructions; and
   a processor in communication with the tracer and the memory, the processor is configured to:
     execute the computer readable instructions;
     start the tracer; and
     execute a program in the first domain; and
     obtain a process identification of a current process from the first domain before the tracer collects a to-be-audited information;
   the tracer is configured to collect the to-be-audited information during execution of the program, the to-be-audited information comprising control flow information of the program; and
   the processor is further configured to execute the computer readable instructions to:
     obtain the to-be-audited information in the second domain;
     use the process identification together with the control flow information as the to-be-audited information;
     search the second domain for an audit rule that matches the process identification;
     audit the to-be-audited information according to the audit rule; and determine that the audit succeeds when the to-be-audited information matches the audit rule.

2. The computer system according to claim 1, wherein the to-be-audited information further comprises data flow information of the program.

3. The computer system according to claim 1, wherein the processor is further configured to:
 review the tracer when the processor is in the second domain before performing the audit; and
 perform the audit after the review succeeds.

4. The computer system according to claim 1, wherein:
 the processor is further configured to store the process identification in a first register of the tracer;
 the tracer is further configured to read the process identification currently stored in the first register when collecting the control flow information; and
 the processor is further configured to audit the control flow information according to the audit rule.

5. The computer system according to claim 1, wherein the computer system further comprises a first random number generator deployed in the first domain, and the second domain comprises a text segment of the program;
 the processor is further configured to:
  call the first random number generator in the first domain to generate a random number RX before executing the program;
  store the random number RX in a second register of the tracer; and
  obtain a hash value H1 through calculation based on the random number RX and the text segment of the process that executes the program;
 the tracer is further configured to:
  read the random number RX stored in the second register when collecting the control flow information; and
  use the random number RX together with the control flow information as the to-be-audited information; and
 the processor is further configured to:
  obtain the hash value H1 from the second domain;
  obtain a hash value H2 through calculation based on the random number RX and the text segment comprised in the second domain;
  compare H1 with H2; and
  determine that the audit succeeds when H1 is the same as H2 and the to-be-audited information matches the audit rule.

6. The computer system according to claim 1, wherein the computer system further comprises a first random number generator deployed in the first domain and a second random number generator deployed in the second domain;
 the processor is further configured to:
  call the first random number generator to generate a random number when executing the program in the first domain; and
  store the random number in a third register of the tracer;
 the tracer is further configured to:
  read the random number currently stored in the third register when collecting the control flow information; and
  use the random number together with the control flow information as the to-be-audited information; and
 the processor is further configured to:
  obtain, from the second domain, the last random number RY generated by the first random number generator in an execution procedure of the program;
  obtain a quantity n of random number generation times preconfigured in the second domain;
  trigger, based on n, the second random number generator to generate n random numbers;
  compare an $n^{th}$ random number Rn with RY; and
  determine that the audit succeeds when Rn is the same as RY and the to-be-audited information matches the audit rule.

7. The computer system according to claim 1, wherein at least some components of the tracer are deployed in the second domain through hardware division, or the at least some components of the tracer are deployed in the second domain through software permission management, and the second domain is more secure than the first domain.

8. The computer system according to claim 1, wherein the audit rule is obtained using a machine learning method.

9. The computer system according to claim 1, wherein the program is stored in a read-only storage area of the memory.

10. A security control method for a computer system in which a first domain and a second domain are deployed, the security control method comprising:
 obtaining a process identification of a current process from the first domain before a tracer collects a to-be-audited information;
 obtaining the to-be-audited information in the second domain using the tracer when a program in the first domain is executed, the to-be-audited information comprising control flow information of the program;
 using the process identification together with the control flow information as the to-be-audited information;
 searching the second domain for an audit rule that matches the process identification;
 auditing, in the second domain, the to-be-audited information according to an audit rule; and
 determining that the audit succeeds and allowing access to the second domain when the to-be-audited information matches the audit rule.

11. The method according to claim 10, wherein the to-be-audited information further comprises data flow information of the program.

12. The method according to claim 10, wherein before the control flow information is audited, the method further comprises:
 reviewing the tracer in the second domain; and
 auditing the control flow information after the review succeeds.

13. The method according to claim 10, wherein the method further comprises:
 storing the process identification in a first register of the tracer;
 reading the process identification currently stored in the first register when collecting the control flow information; and
 auditing the control flow information according to the found audit rule.

14. The method according to claim 10, wherein the computer system further comprises a first random number generator deployed in the first domain, and the second domain comprises a text segment of the program, the method further comprising:
 calling the first random number generator in the first domain to generate a random number RX before the program is executed;
 storing the random number RX in a second register of the tracer; and obtaining a hash value H1 through calculation based on the random number RX and the text segment of the process that executes the program;

the obtaining the to-be-audited information using the tracer comprises:

obtaining the to-be-audited information collected by the tracer, the to-be-audited information further comprising the random number RX, and RX is obtained by the tracer accessing the second register; and the auditing the to-be-audited information according to an audit rule comprises:

obtaining the hash value H1;

obtaining a hash value H2 through calculation based on the random number RX and the text segment comprised in the second domain;

comparing H1 with H2; and determining that the audit succeeds when H1 is the same as H2 and other to-be-audited information matches the audit rule.

15. The method according to claim 10, wherein the computer system further comprises a first random number generator deployed in the first domain and a second random number generator deployed in the second domain, the method further comprising:

calling the first random number generator in the first domain to generate a random number when the program is executed; and writing the random number into a third register of the tracer;

the obtaining the to-be-audited information using the tracer comprises:

obtaining the to-be-audited information collected by the tracer, the to-be-audited information further comprising a random number, and the random number is obtained by the tracer accessing the third register; and the auditing the to-be-audited information according to an audit rule comprises:

obtaining the last random number RY generated by the first random number generator in an execution procedure of the program;

obtaining a quantity n of random number generation times preconfigured in the second domain;

triggering, based on n, the second random number generator to generate n random numbers;

comparing an $n^{th}$ random number Rn with RY; and determining that the audit succeeds when Rn is the same as RY and other to-be-audited information matches the audit rule.

16. A non-transitory computer readable storage medium, comprising a computer readable instruction, wherein when the computer readable instruction is executed by one or more processors to perform:

obtaining a process identification of a current process from the first domain before a tracer collects a to-be-audited information;

obtaining the to-be-audited information in a second domain using the tracer when a program in a first domain is executed, the to-be-audited information comprising control flow information of the program;

using the process identification together with the control flow information as the to-be-audited information;

searching the second domain for an audit rule that matches the process identification;

auditing, in the second domain, the to-be-audited information according to an audit rule; and determining that the audit succeeds and allowing access to the second domain when the to-be-audited information matches the audit rule.

17. The computer readable storage medium according to claim 16, wherein the first domain and the second domain are respectively an insecure world and a secure world.

18. The computer readable storage medium according to claim 16, wherein the to-be-audited information further comprises data flow information of the program.

19. The computer readable storage medium according to claim 16, wherein the audit rule is obtained using a machine learning method.

20. The computer readable storage medium according to claim 16, wherein the program is stored in a read-only storage area of the memory.

* * * * *